United States Patent
Vitthaladevuni et al.

(10) Patent No.: US 8,599,777 B2
(45) Date of Patent: Dec. 3, 2013

(54) CHANNEL QUALITY INDICATOR DESIGN FOR MULTIPLE-USER MULTIPLE-INPUT AND MULTIPLE-OUTPUT IN HIGH-SPEED PACKET ACCESS SYSTEMS

(75) Inventors: Pavan Kumar Vitthaladevuni, San Diego, CA (US); Haitong Sun, San Diego, CA (US); Danlu Zhang, San Diego, CA (US); Vinay Chande, San Diego, CA (US); Stefan Brueck, Nuremberg (DE); Josef J. Blanz, Forst (DE)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 12/946,702

(22) Filed: Nov. 15, 2010

(65) Prior Publication Data
US 2011/0176484 A1 Jul. 21, 2011

Related U.S. Application Data

(60) Provisional application No. 61/262,111, filed on Nov. 17, 2009.

(51) Int. Cl.
*H04W 28/00* (2009.01)
*H04W 76/00* (2009.01)

(52) U.S. Cl.
USPC .................... 370/329; 370/465; 370/468

(58) Field of Classification Search
None
See application file for complete search history.

(56) References Cited

U.S. PATENT DOCUMENTS

| | | | |
|---|---|---|---|
| 2003/0204615 A1* | 10/2003 | Wei et al. | 709/232 |
| 2006/0209764 A1 | 9/2006 | Kim et al. | |
| 2008/0132281 A1 | 6/2008 | Kim et al. | |
| 2008/0207151 A1* | 8/2008 | Rinne et al. | 455/140 |
| 2009/0010354 A1* | 1/2009 | Sudo | 375/267 |
| 2009/0249151 A1* | 10/2009 | Zhou et al. | 714/748 |
| 2009/0268675 A1 | 10/2009 | Choi | |
| 2012/0087397 A1* | 4/2012 | Sudo | 375/219 |

FOREIGN PATENT DOCUMENTS

| | | |
|---|---|---|
| EP | 1830484 | 7/2009 |
| WO | WO03094384 | 11/2003 |

OTHER PUBLICATIONS

Beh, Kian Chung; Doufexi, Angela; Armour, Simon, "On the performance of SU-MIMO and MU-MIMO in 3GPP LTE downlink," International Symposium on Personal, Indoor and Mobile Radio Communications, pp. 1482-1486, 2009.
Shikh-Bahaei, M. "Joint Optimization of 'Transmission Rate' and 'Outer-Loop SNR Target' Adaptation Over Fading Channels," IEEE Transactions on Communications, vol. 55, Iss. 3, pp. 398-403, Mar. 2007.
International Search Report and Written Opinion—PCT/US2010/057113, ISA/EPO—Jun. 12, 2011.

(Continued)

*Primary Examiner* — Robert Scheibel
(74) *Attorney, Agent, or Firm* — Darren M. Simon

(57) ABSTRACT

A method for providing multiple-user multiple-input and multiple-output in a high-speed packet access system is described. A channel quality indicator is received from a dual-stream-capable wireless communication device requesting a single-stream transmission at a first data rate. The first data rate is adjusted by an adaptive outer loop margin to obtain a second data rate. A data stream is transmitted to the wireless communication device using the second data rate. A positive-acknowledgement/negative-acknowledgement (ACK/NACK) is received from the wireless communication device. The adaptive outer loop margin is adjusted according to the received ACK/NACK.

14 Claims, 12 Drawing Sheets

(56) References Cited

OTHER PUBLICATIONS

Qualcomm Europe: "Applicability of Tx Diversity in MIMO", 3GPP Draft, R1-092616__APP_TX_DIV_MIM0, 3rd Generation Partnership Project (3GPP), Mobile Competence Centre, 650, Route Des Lucioles, F-06921 Sophia-Antipolis Cedex, France, no. Los Angeles, USA, Jun. 26, 2009, XP050351110, [retrieved on Jun. 26, 2009].

Qualcomm Europe: "MIMO Codebook restrictions for single stream transmissions", 3GPP Draft, R1-095068_MIM0_C0DEB00K_RESTRICTI0NS, 3rd Generation Partnership Project (3GPP), Mobile Competence Centre, 650, Route Des Lucioles, F-06921 Sophia-Antipolis Cedex, France, no. Jeju, Nov. 9, 2009, XP050389407, [retrieved on Nov. 13, 2009].

* cited by examiner

|  | UE1 404a | UE2 404b | UE3 404c | UE4 404d | UE5 404e |
|---|---|---|---|---|---|
| UE1 404a |  | Non-Orthogonal | Non-Orthogonal | Orthogonal (User Equipment (UE) Pair) 432a | Non-Orthogonal |
| UE2 404b | Non-Orthogonal |  | Orthogonal (User Equipment (UE) Pair) 432b | Non-Orthogonal | Non-Orthogonal |
| UE3 404c | Non-Orthogonal | Orthogonal (User Equipment (UE) Pair) 432b |  | Non-Orthogonal | Non-Orthogonal |
| UE4 404d | Orthogonal (User Equipment (UE) Pair) 432a | Non-Orthogonal | Non-Orthogonal |  | Non-Orthogonal |
| UE5 404e | Non-Orthogonal | Non-Orthogonal | Non-Orthogonal | Non-Orthogonal |  |

FIG. 4

CHANNEL QUALITY INDICATOR DESIGN FOR MULTIPLE-USER MULTIPLE-INPUT AND MULTIPLE-OUTPUT IN HIGH-SPEED PACKET ACCESS SYSTEMS

RELATED APPLICATIONS

This application is related to and claims priority from U.S. Provisional Patent Application Ser. No. 61/262,111, filed Nov. 17, 2009, for "CQI DESIGN FOR MULTI-USER MIMO IN HSPA."

TECHNICAL FIELD

The present disclosure relates generally to wireless communication systems. More specifically, the present disclosure relates to systems and methods for channel quality indicator (CQI) design for multiple-user multiple-input and multiple-output (MU-MIMO) in high-speed packet access (HSPA) systems.

BACKGROUND

Wireless communication systems are widely deployed to provide various types of communication content such as voice, video, data and so on. These systems may be multiple-access systems capable of supporting simultaneous communication of multiple terminals with one or more base stations.

A problem that must be dealt with in all communication systems is fading or other interference. There may be problems with decoding the signals received. One way to deal with these problems is by utilizing beamforming. With beamforming, instead of using each transmit antenna to transmit a spatial stream, the transmit antennas each transmit a linear combination of the spatial streams, with the combination being chosen so as to optimize the response at the receiver.

Smart antennas are arrays of antenna elements, each of which receive a signal to be transmitted with a predetermined phase offset and relative gain. The net effect of the array is to direct a (transmit or receive) beam in a predetermined direction. The beam is steered by controlling the phase and gain relationships of the signals that excite the elements of the array. Thus, smart antennas direct a beam to each individual mobile unit (or multiple mobile units) as opposed to radiating energy to all mobile units within a predetermined coverage area (e.g., 120°) as conventional antennas typically do. Smart antennas increase system capacity by decreasing the width of the beam directed at each mobile unit and thereby decreasing interference between mobile units. Such reductions in interference result in increases in signal-to-interference and signal-to-noise ratios that improve performance and/or capacity. In power controlled systems, directing narrow beam signals at each mobile unit also results in a reduction in the transmit power required to provide a given level of performance.

Wireless communication systems may use beamforming to provide system-wide gains. In beamforming, multiple antennas on the transmitter may steer the direction of transmissions toward multiple antennas on the receiver. Beamforming may reduce the signal-to-noise ratio (SNR). Beamforming may also decrease the amount of interference received by terminals in neighboring cells. Benefits may be realized by providing improved beamforming techniques.

SUMMARY

A method for providing multiple-user multiple-input and multiple-output in a high speed packet access system is described. A channel quality indicator is received from a dual stream capable wireless communication device requesting a single-stream transmission at a first data rate. The first data rate is adjusted by an adaptive outer loop margin to obtain a second data rate. A data stream is transmitted to the wireless communication device using the second data rate. A positive-acknowledgement/negative-acknowledgement (ACK/NACK) is received from the wireless communication device. The adaptive outer loop margin is adjusted according to the received ACK/NACK.

The method may be performed by a Node B. It may be determined to use single-user multiple-input and multiple-output for transmissions. The data stream may be transmitted using single-user multiple-input and multiple-output. It may be determined to use multiple-user multiple-input and multiple-output for transmissions. The data stream may then be transmitted using multiple-user multiple-input and multiple-output.

The ACK/NACK may include a positive-acknowledgement (ACK). Adjusting the adaptive outer loop margin may include incrementally decreasing the adaptive outer loop margin. The ACK/NACK may include a negative-acknowledgement (NACK). Adjusting the adaptive outer loop margin may include incrementally increasing the adaptive outer loop margin. The adaptive outer loop margin may include a first adaptive outer loop margin for single-user multiple-input and multiple-output transmissions and a second adaptive outer loop margin for multiple-user multiple-input and multiple-output transmissions.

A wireless device configured for providing multiple-user multiple-input and multiple-output in a high-speed packet access system is also described. The wireless device includes a processor, memory in electronic communication with the processor and instructions stored in the memory. The instructions are executable by the processor to receive a channel quality indicator from a dual stream capable wireless communication device requesting a single-stream transmission at a first data rate. The instructions are also executable by the processor to adjust the first data rate by an adaptive outer loop margin to obtain a second data rate. The instructions are further executable by the processor to transmit a data stream to the wireless communication device using the second data rate. The instructions are also executable by the processor to receive a positive-acknowledgement/negative-acknowledgement (ACK/NACK) from the wireless communication device. The instructions are further executable by the processor to adjust the adaptive outer loop margin according to the received ACK/NACK.

A method for providing channel quality indicators to a base station that is providing multiple-user multiple-input and multiple-output in a high speed packet access system is described. A first channel quality indicator is determined. The first channel quality indicator is an optimal single-stream multiple-input and multiple-output channel quality indicator adjusted for inter-stream interference. The first channel quality indicator is sent to the base station. A second channel quality indicator is determined. The second channel quality indicator is an optimal multiple-input and multiple-output channel quality indicator generated according to Release 7. The second channel quality indicator is sent to the base station.

The method may be performed by a wireless communication device. The second channel quality indicator may be a single-stream channel quality indicator or a multiple-stream channel quality indicator. The first channel quality indicator may be interlaced with the second channel quality indicator. A feedback cycle may be one. The first channel quality indicator may correspond to a first transmission time interval and the second channel quality indicator may correspond to a second transmission time interval. The base station may use the first channel quality indicator or the second channel quality indicator when scheduling multiple-user multiple-input and multiple-output transmissions.

A wireless device configured for providing channel quality indicators to a base station that is providing multiple-user multiple-input and multiple-output in a high-speed packet access system is also described. The wireless device includes a processor, memory in electronic communication with the processor and instructions stored in the memory. The instructions are executable by the processor to determine a first channel quality indicator that is an optimal single-stream multiple-input and multiple-output channel quality indicator adjusted for inter-stream interference. The instructions are also executable by the processor to send the first channel quality indicator to the base station. The instructions are further executable by the processor to determine a second channel quality indicator that is an optimal multiple-input and multiple-output channel quality indicator generated according to Release 7. The instructions are also executable by the processor to send the second channel quality indicator to the base station.

A wireless device configured for providing multiple-user multiple-input and multiple-output in a high-speed packet access system is described. The wireless device includes means for receiving a channel quality indicator from a dual stream capable wireless communication device requesting a single-stream transmission at a first data rate. The wireless device also includes means for adjusting the first data rate by an adaptive outer loop margin to obtain a second data rate. The wireless device further includes means for transmitting a data stream to the wireless communication device using the second data rate. The wireless device also includes means for receiving a positive-acknowledgement/negative-acknowledgement (ACK/NACK) from the wireless communication device. The wireless device further includes means for adjusting the adaptive outer loop margin according to the received ACK/NACK.

A wireless device configured for providing channel quality indicators to a base station that is providing multiple-user multiple-input and multiple-output in a high-speed packet access system is also described. The wireless device includes means for determining a first channel quality indicator that is an optimal single-stream multiple-input and multiple-output channel quality indicator adjusted for inter-stream interference. The wireless device also includes means for sending the first channel quality indicator to the base station. The wireless device further includes means for determining a second channel quality indicator that is an optimal multiple-input and multiple-output channel quality indicator generated according to Release 7. The wireless device also includes means for sending the second channel quality indicator to the base station.

A computer-program product for providing multiple-user multiple-input and multiple-output in a high-speed packet access system is described. The computer-program product includes a non-transitory computer-readable medium having instructions thereon. The instructions include code for causing a base station to receive a channel quality indicator from a dual stream capable wireless communication device requesting a single-stream transmission at a first data rate. The instructions also include code for causing the base station to adjust the first data rate by an adaptive outer loop margin to obtain a second data rate. The instructions further include code for causing the base station to transmit a data stream to the wireless communication device using the second data rate. The instructions also include code for causing the base station to receive a positive-acknowledgement/negative-acknowledgement (ACK/NACK) from the wireless communication device. The instructions further include code for causing the base station to adjust the adaptive outer loop margin according to the received ACK/NACK.

A computer-program product for providing channel quality indicators to a base station that is providing multiple-user multiple-input and multiple-output in a high-speed packet access system is also described. The computer-program product includes a non-transitory computer-readable medium having instructions thereon. The instructions include code for causing a wireless communication device to determine a first channel quality indicator that is an optimal single-stream multiple-input and multiple-output channel quality indicator adjusted for inter-stream interference. The instructions also include code for causing the wireless communication device to send the first channel quality indicator to the base station. The instructions further include code for causing the wireless communication device to determine a second channel quality indicator that is an optimal multiple-input and multiple-output channel quality indicator generated according to Release 7. The instructions also include code for causing the wireless communication device to send the second channel quality indicator to the base station.

BRIEF DESCRIPTION OF THE DRAWINGS

FIG. 4 is a block diagram illustrating a comparison table for pairing user equipments (UEs);

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

Figure 1:
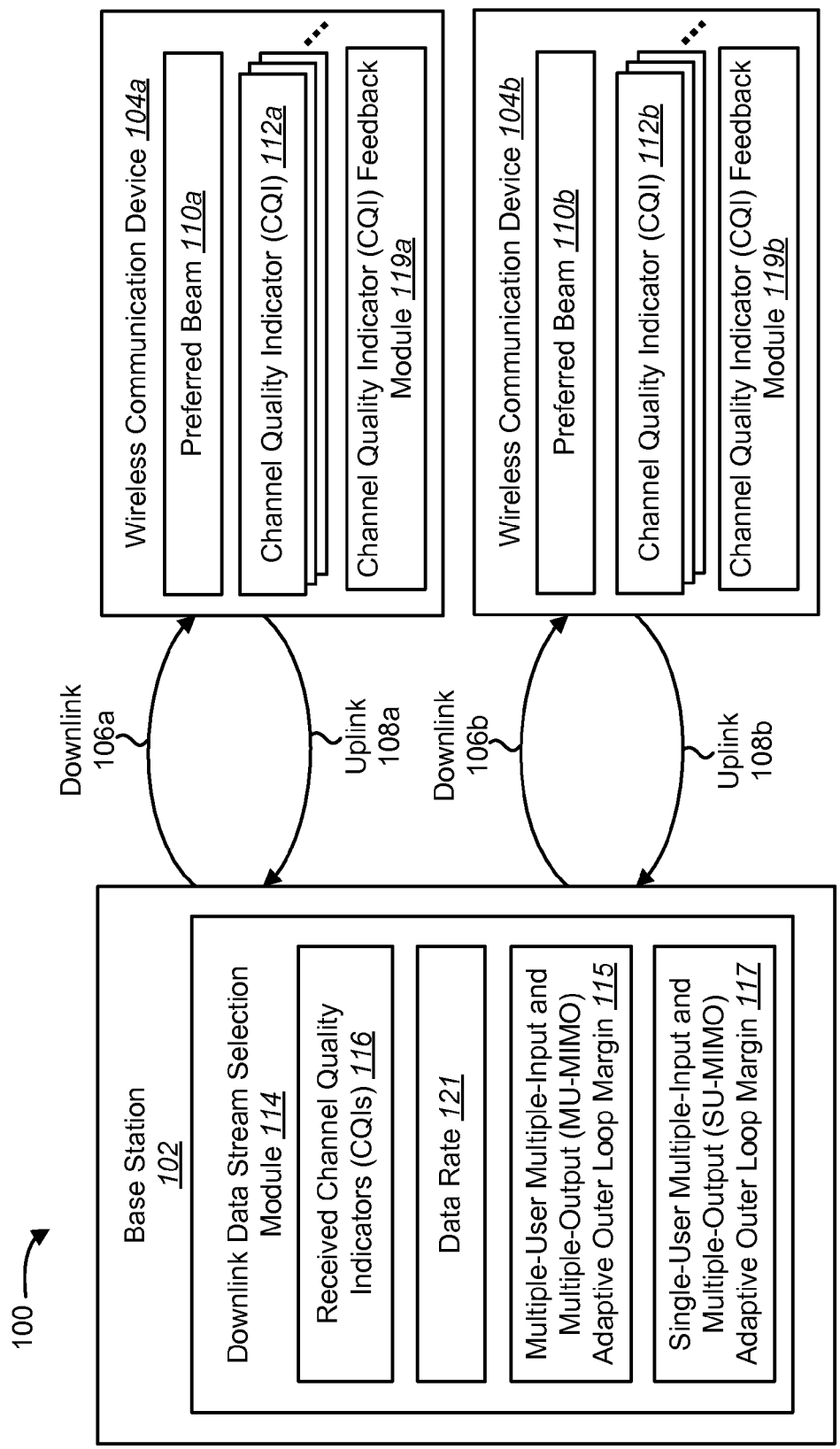
FIG. 1 shows a wireless communication system with multiple wireless devices.

FIG. 1 shows a wireless communication system 100 with multiple wireless devices. Wireless communication systems 100 are widely deployed to provide various types of communication content such as voice, data and so on. A wireless device may be a base station 102 or a wireless communication device 104.

A base station 102 is a station that communicates with one or more wireless communication devices 104. A base station 102 may also be referred to as, and may include some or all of the functionality of, an access point, a broadcast transmitter, a NodeB, an evolved NodeB, etc. The term "Base Station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink 108a-b and downlink 106a-b transmissions are on the same frequency region so that the reciprocity principle allows the estimation of the downlink 106 channel from the uplink 108 channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

A UMTS Terrestrial Radio Access Network (UTRAN) is a collective term for the Node Bs (or base stations 102) and the control equipment for the Node Bs (or radio network controllers (RNCs)) it contains that make up the UMTS radio access network. This is a 3 G communications network that can carry both real-time circuit switched and Internet Protocol (IP)-based packet switched traffic types.

The UTRAN is connected internally or externally to other functional entities by four interfaces: Iu, Uu, Iub and Iur. The UTRAN is attached to a GSM core network via an external interface called Iu. A radio network controller (RNC) supports this interface. The radio network controller (RNC) also manages a set of base stations 102 through interfaces called Iub. The Iur interface connects two radio network controllers (RNCs) with each other. The UTRAN is largely autonomous from the core network since the radio network controllers (RNCs) are interconnected by the Iur interface. The Uu is also external and connects a Node B with a user equipment (UE). The Iub is an internal interface connecting the radio network controller (RNC) with the Node B.

A base station 102 may communicate with one or more wireless communication devices 104. For example, the base station 102 may communicate with a first wireless communication device 104a and a second wireless communication device 104b. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one or multiple base stations 102 on the downlink 106 and/or uplink 108 at any given moment. The downlink 106 (or forward link) refers to the communication link from a base station 102 to a wireless communication device 104, and the uplink 108 (or reverse link) refers to the communication link from a wireless communication device 104 to a base station 102.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink. HSDPA and HSUPA are thus parts of the family of mobile telephony protocols named High-Speed Packet Access (HSPA). Release 7 HSPA+ uses three enhancements to improve data rate. First, support was introduced for 2×2 multiple-input and multiple-output (MIMO) on the downlink 106. With MIMO, the peak data rate supported on the downlink 106 is 28 megabits per second (Mbps). Second, higher order modulation was introduced on the downlink 106. The use of 64 quadrature amplitude modulation (QAM) on the downlink 106 allows peak data rates of 21 Mbps. Third, higher order modulation was introduced on the uplink 108. The use of 16 QAM on the uplink 108 allows peak data rates of 11 Mbps.

In HSUPA, the base station 102 may allow several wireless communication devices 104 to transmit at a certain power level at the same time (using grants). These grants are assigned to wireless communication devices 104 by using a fast scheduling algorithm that allocates the resources on a short-term basis (i.e., on the order of tens of milliseconds (ms)). The rapid scheduling of HSUPA is well suited to the bursty nature of packet data. During periods of high activity, a wireless communication device 104 may get a larger percentage of the available resources, while getting little or no bandwidth during periods of low activity.

In 3GPP Release 5 HSDPA, a base station 102 may send downlink payload data to wireless communication devices on the High-Speed Downlink Shared Channel (HS-DSCH). A base station 102 may also send the control information associated with the downlink data on the High-Speed Shared Control Channel (HS-SCCH). There are 256 Orthogonal Variable Spreading Factor (OVSF) codes (or Walsh codes) used for data transmission. In HSDPA systems, these codes are partitioned into Release 1999 (legacy system) codes that are typically used for cellular telephony (voice) and HSDPA codes that are used for data services. For each transmission time interval (TTI), the dedicated control information sent to an HSDPA-enabled wireless communication device 104 may indicate to the wireless communication device 104 which codes within the code space will be used to send downlink payload data to the wireless communication device 104 and the modulation that will be used for transmission of the downlink payload data.

With HSDPA operations, downlink transmissions to the wireless communication devices 104*a-b* may be scheduled for different transmission time intervals (TTIs) using the 15 available HSDPA Orthogonal Variable Spreading Factor (OVSF) codes. For a given transmission time interval (TTI), each wireless communication device 104 may be using one or more of the 15 HSDPA codes, depending on the downlink bandwidth allocated to the wireless communication device 104 during the transmission time interval (TTI). As discussed above, for each transmission time interval (TTI), the control information indicates to the wireless communication device 104 which codes within the code space will be used to send downlink payload data (data other than control data of the wireless communications system 100) to the wireless communication device 104, along with the modulation that will be used for the transmission of the downlink payload data.

Based on communications received from a base station 102, a wireless communication device 104 may generate one or more channel quality indicators (CQIs) 112*a-b*. Each channel quality indicator (CQI) 112 may be a channel measurement for the downlink 106 channel between the base station 102 and the wireless communication device 104. A channel quality indicator (CQI) 112 may be dependent on the transmission scheme used in the wireless communications system 100. Because multiple-input and multiple-output (MIMO) communication is used between the base station 102 and the wireless communication device 104, each channel quality indicator (CQI) 112 may correspond to a different downlink 106 channel (i.e., a different transmit antenna and receive antenna pair) between the base station 102 and the wireless communication device 104.

A wireless communication device 104 may use the channel quality indicators (CQIs) 112 to determine a preferred beam 110*a-b*. A preferred beam 110 may refer to the antenna structure, weight, transmission direction and phase of a signal transmitted by the base station 102 to the wireless communication device 104. The terms "beam" and "precoding vector" may refer to the direction in which data is streamed wirelessly from an antenna. In multiple-input and multiple-output (MIMO), multiple beams may be used to transmit information between a base station 102 and a wireless communication device 104. A preferred beam may thus refer to a beam that produces the best (i.e., the optimal) data stream between the base station 102 and the wireless communication device 104.

In Release 7 of HSPA, single-user MIMO (SU-MIMO) is used. When a wireless communication device 104 has good geometry (i.e., the wireless communication device 104 is in a good position relative to the base station 102), the wireless communication device 104 may request dual-stream transmissions from the base station 102. In dual-stream transmissions, the base station 102 may transmit a first data stream and a second data stream to a wireless communication device 104 during a transmission time interval (TTI). The first data stream and the second data stream may be transmitted on orthogonal antenna beams. It is inherent that one of the data streams (i.e., a preferred data stream) will have a higher throughput than the other. When a MIMO-capable wireless communication device 104 requests dual-stream transmission, the channel quality indicator (CQI) 112 of the preferred beam may be higher than that of an orthogonal beam used in addition to the preferred beam. Hence, transmitting on both data streams to a wireless communication device 104 may not result in the most efficient resource usage.

In contrast, multiple-user MIMO (MU-MIMO) may increase user throughputs on the downlink 106 over traditional SU-MIMO by making more intelligent use of the base station 102 resources. MU-MIMO may enable an increase in throughput for a particular transmission time interval (TTI) compared to dual-stream transmission to a single wireless communication device 104. The downlink data stream selection module 114 may thus determine whether to use dual downlink data streams for a single wireless communication device 104 (i.e., SU-MIMO) or to use a first data stream for a first wireless communication device 104*a* and a second data stream that is orthogonal to the first data stream for a second wireless communication device 104*b* (i.e., MU-MIMO).

A channel quality indicator (CQI) 112 may correspond to a request for a single-stream transmission or a dual-stream transmission. As discussed above, a wireless communication device 104 may include multiple channel quality indicators (CQIs) 112. The wireless communication device 104 may generate multiple channel quality indicators (CQIs) 112 for each transmission time interval (TTI). A wireless communication device 104 may not send every channel quality indicator (CQI) 112 to the base station 102 for every transmission time interval (TTI). In the current standard, a wireless communication device 104 may send only the optimal channel quality indicator (CQI) 112 to the base station 102 for each transmission time interval (TTI).

If the wireless communication device 104 determines that it has good geometry with respect to the base station 102 (i.e., the channel quality between the base station 102 and the wireless communication device 104 is above a threshold), the wireless communication device 104 may send an optimal dual-stream multiple-input and multiple-output (MIMO) channel quality indicator (CQI) 112 to the base station 102. If the wireless communication device 104 determines that it has bad geometry with respect to the base station 102 (i.e., the channel quality between the base station 102 and the wireless communication device 104 is below the threshold), the wireless communication device 104 may send an optimal single-stream multiple-input and multiple-output (MIM) channel quality indicator (CQI) 112 to the base station 102.

However, these channel quality indicators (CQIs) 112 do not take into account inter-stream interference (ISI). Inter-stream interference (ISI) refers to the interference that may occur when the base station 102 transmits multiple data streams simultaneously. If inter-stream interference (ISI) is not taken into account, a base station 102 may use a bit rate that the wireless communication device 104 is unable to decode.

Each wireless communication device 104 may include a channel quality indicator (CQI) feedback module 119*a-b*. A channel quality indicator (CQI) feedback module 119 may be used by the wireless communication device 104 to determine what channel quality indicator (CQI) 112 to send to the base station 102. The channel quality indicator (CQI) feedback module 119 may generate some single-stream channel quality indicators (CQIs) 112 that are adjusted to account for inter-stream interference (ISI). In one configuration, the channel quality indicator (CQI) feedback module 119 may alternate between sending a channel quality indicator (CQI) 112 generated using Release 7 and a channel quality indicator (CQI) 112 adjusted for inter-stream interference (ISI) for each transmission time interval (TTI).

A wireless communication device 104 may transmit the channel quality indicators (CQIs) 112 to the base station 102 via the uplink 108 channel. The base station 102 may thus receive channel quality indicators (CQI) 116 from many wireless communication devices 104 corresponding to many downlink 106 channels. The base station 102 may include a downlink data stream selection module 114. The downlink data stream selection module 114 may include the received channel quality indicators (CQIs) 116. The downlink data stream selection module 114 may use the received channel quality indicators (CQIs) 116 to determine scheduling for each wireless communication device 104. The downlink data stream selection module 114 is discussed in further detail below in relation to FIG. 2.

The downlink data stream selection module 114 may include a data rate 121. The data rate 121 may refer to the bit rate of a downlink 106 data stream. The downlink data stream selection module 114 may also include a multiple-user multiple-input and multiple output (MU-MIMO) adaptive outer loop margin 115. The multiple-user multiple-input and multiple-output (MU-MIMO) adaptive outer loop margin 115 may be an adjustment that the base station 102 applies to the data rate 121 for each channel quality indicator (CQI) 112 feedback cycle. If the channel quality indicator (CQI) 112 feedback cycle is 1, a wireless communication device 104 may report a channel quality indicator (CQI) 112 for each transmission time interval (TTI).

The multiple-user multiple-input and multiple-output (MU-MIMO) adaptive outer loop margin 115 may be used by the base station 102 to increase or decrease the data rate 121 when a wireless communication device 104 sends a single-stream channel quality indicator (CQI) 112 and the base station 102 has determined to use a multiple-user multiple-input and multiple-output (MU-MIMO) transmissions.

The downlink data stream selection module 114 may also include a single-user multiple-input and multiple-output (SU-MIMO) adaptive outer loop margin 117. The single-user multiple-input and multiple-output (SU-MIMO) adaptive outer loop margin 117 may be used by the base station 102 to increase or decrease the data rate 121 when a wireless communication device 104 has requested either a single-stream or a dual-stream transmission and the base station 102 determines to use a single-user multiple-input and multiple-output (SU-MIMO) transmission or when the wireless communication device 104 has requested a dual-stream transmission and the base station 102 determines to use a multiple-user multiple-input and multiple-output (MU-MIMO) transmission. Both the single-user multiple-input and multiple-output (SU-MIMO) adaptive outer loop margin 117 and the multiple-user multiple-input and multiple-output (MU-MIMO) adaptive outer loop margin 115 may be adjusted/updated based upon the reception of a positive-acknowledgement/negative-acknowledgement (ACK/NACK) from a wireless communication device 104. Single-user multiple-input and multiple-output (SU-MIMO) adaptive outer loop margins 117 and multiple-user multiple-input and multiple-output (MU-MIMO) adaptive outer loop margins 115 are discussed in additional detail below in relation to FIG. 3.

Figure 2:
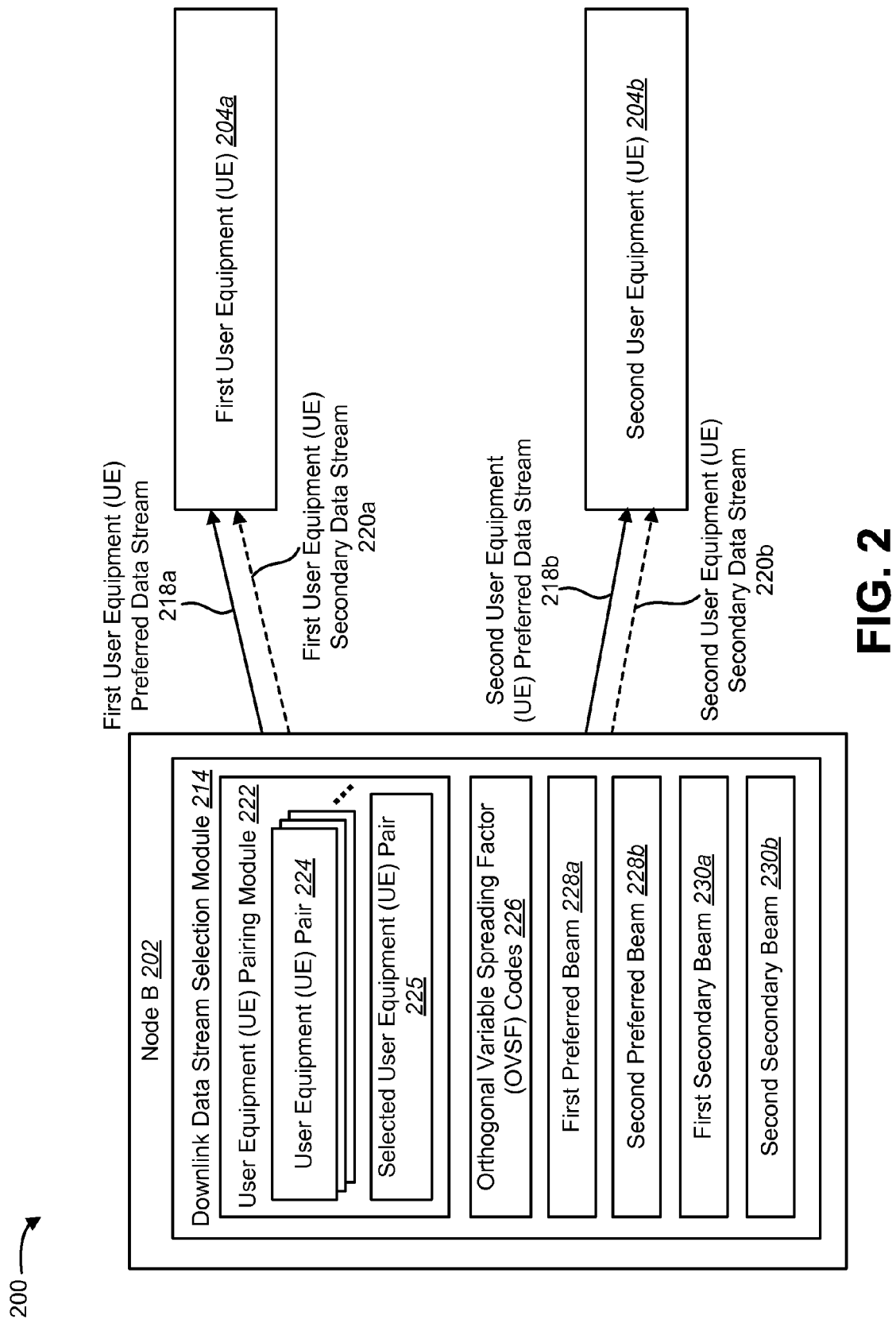
FIG. 2 shows another wireless communication system with multiple wireless devices.

FIG. 2 shows another wireless communication system 200 with multiple wireless devices. The wireless communication system 200 may include a Node B 202. The Node B 202 of FIG. 2 may be one configuration of the base station 102 of FIG. 1. The wireless communication system 200 may also include a first user equipment (UE) 204*a* and a second user equipment (UE) 204*b*. The first user equipment (UE) 204*a* and the second user equipment (UE) 204*b* of FIG. 2 may be one configuration of the wireless communication devices 104*a-b* of FIG. 1.

The Node B 202 may include a downlink data stream selection module 214. The downlink data stream selection module 214 of FIG. 2 may be one configuration of the downlink data stream selection module 114 of FIG. 1. The downlink data stream selection module 214 may include a user equipment (UE) pairing module 222. The user equipment (UE) pairing module 222 may determine one or more user equipment (UE) pairs 224. A user equipment (UE) pair 224 may refer to two user equipments (UEs) 204 with preferred data streams 218 that are orthogonal to each other. User equipment (UE) pairs 224 are discussed in additional detail below in relation to FIG. 4. The Node B 202 may also include a selected user equipment (UE) pair 225. Since the Node B 202 can only transmit two orthogonal data streams at a time, only one user equipment (UE) pair 224 may be selected as the user equipment (UE) pair 225. Optimization procedures may be used to determine the selected user equipment (UE) pair 225.

The Node B 202 may select a user equipment (UE) pair 224 as the selected user equipment (UE) pair 225. In one configuration, the Node B 202 may select a user equipment (UE) pair 224 if the sum rate of data streams for two different user equipments (UEs) 204 is larger than the UE-specific sum rate of the two data streams. For example, if the first user equipment (UE) 204*a* requests two data streams, the first user equipment (UE) 204*a* may report a preferred primary precoding vector b1 and the two channel quality indicators (CQIs) 112 CQI1 and CQI2 that correspond to the preferred (strong) data stream 218*a* and the secondary (weak) data stream 220, respectively. Similarly, if the second user equipment (UE) 204*b* requests two streams of data, the second user equipment (UE) 204*b* may report a preferred primary precoding vector b2 and channel quality indicators (CQIs) 112 CQI1' and CQI2' for both data streams.

The preferred secondary precoding vector (that is orthogonal to b1) is b2 and may be known by the base station 102 based on the preferred primary precoding vector b1. If CQI1>CQI1' and CQI2>CQI2', the first user equipment (UE) preferred data stream 218*a* may be mapped to precoding vector b1 and the second user equipment (UE) preferred data stream 218*b* may be mapped to precoding vector b2. The base station 102 may only be capable of sending a maximum of two data streams in a given transmission time interval (TTI) on orthogonal beams. Therefore, only user equipments (UEs) 204 that have orthogonal preferred beams 228 may be paired.

If both the first user equipment (UE) 204a and the second user equipment (UE) 204b request beams b1 and b2, the Node B 202 may pair the two user equipments (UEs) 204 on beams b1 and b2. If the Node B 202 finds this pairing to be maximizing a certain metric during the transmission time interval (TTI), the Node B 202 may schedule data streams to the selected user equipment (UE) pair 225 in the same transmission time interval (TTI) using the same orthogonal variable spreading factor (OVSF) codes 226. An orthogonal variable spreading factor (OVSF) code 226 is an orthogonal code that facilitates uniquely identifying individual communication channels. One example of a metric that may be maximized is the sum proportional fair metric. In the sum proportional fair metric, the proportional fair metrics per stream are summed whenever MU-MIMO transmission is considered. Other metrics may also be used.

The Node B 202 may communicate with the first user equipment (UE) 204a during a first transmission time interval (TTI) using SU-MIMO. For example, the Node B 202 may transmit a first user equipment (UE) preferred data stream 218a to the first user equipment (UE) 204a using a first preferred beam 228a. The Node B 202 may also transmit a first user equipment (UE) secondary data stream 220a to the first user equipment (UE) 204a using a first secondary beam 230a. The first preferred beam 228a and the first secondary beam 230a may be orthogonal to each other.

During a second transmission time interval (TTI), the Node B 202 may communicate with the second user equipment (UE) 204b. For example, the Node B 202 may transmit a second user equipment (UE) preferred data stream 218b to the second user equipment (UE) 204b using a second preferred beam 228b. The Node B 202 may also transmit a second user equipment (UE) secondary data stream 220b to the second user equipment (UE) 204b using a second secondary beam 230b. The second preferred beam 228b and the second secondary beam 230b may be orthogonal to each other.

Sending two data streams on orthogonal beams to the same user equipment (UE) 204 may not result in the best resource usage for the wireless communication system 200. In other words, sending two data streams on orthogonal beams to the same user equipment (UE) 204 may not allocate power in the Node B 202 in the most efficient way because the preferred data stream 218 has a stronger channel quality indicator (CQI) 112 than a secondary data stream 220. If the same amount of power is used to transmit each data stream, throughput for the secondary data stream 220 will be lower than throughput for the preferred data stream 218 (due to the secondary data stream 220 having a lower channel quality indicator (CQI)) 112.

By using MU-MIMO instead of SU-MIMO, user throughputs on the downlink 106 may be increased by more intelligently using the resources of the Node B 202. In MU-MIMO, the Node B 202 may find a first user equipment (UE) 204a and a second user equipment (UE) 204b with preferred beams 228 that are orthogonal to each other. The first user equipment (UE) 204a and the second user equipment (UE) 204b may be referred to as a user equipment (UE) pair 224.

Instead of transmitting a dual stream (i.e., a preferred data stream 218 and a secondary data stream 220) during one transmission time interval (TTI) to a user equipment (UE) 204, the Node B 202 may transmit a first user equipment (UE) preferred data stream 218a to the first user equipment (UE) 204a while simultaneously transmitting a second user equipment (UE) preferred data stream 218b to the second user equipment (UE) 204b. Thus, the Node B 202 may refrain from transmitting a first user equipment (UE) secondary data stream 220a and a second user equipment (UE) secondary data stream 220b. The Node B 202 may transmit the first user equipment (UE) preferred data stream 218a and the second user equipment (UE) preferred data stream 218b using the same codes (e.g., an orthogonal variable spreading factor (OVSF) code 226 with a spreading factor of sixteen). Because the Node B 202 does not have to allocate power to a data stream with lower throughput, the throughput for the wireless communication system 200 may be improved.

The Node B 202 may transmit the first user equipment (UE) preferred data stream 218a using a first preferred beam 228a. The Node B 202 may transmit the first user equipment (UE) secondary data stream 220a using a first secondary beam 230a. The Node B 202 may transmit the second user equipment (UE) preferred data stream 218b using a second preferred beam 228b. The Node B 202 may also transmit the second user equipment (UE) secondary data stream 220b using a second secondary beam 230b. If the first user equipment (UE) 204a and the second user equipment (UE) 204b are a user equipment (UE) pair 224, then the first preferred beam 228a and the second preferred beam 228b are orthogonal.

Figure 3:
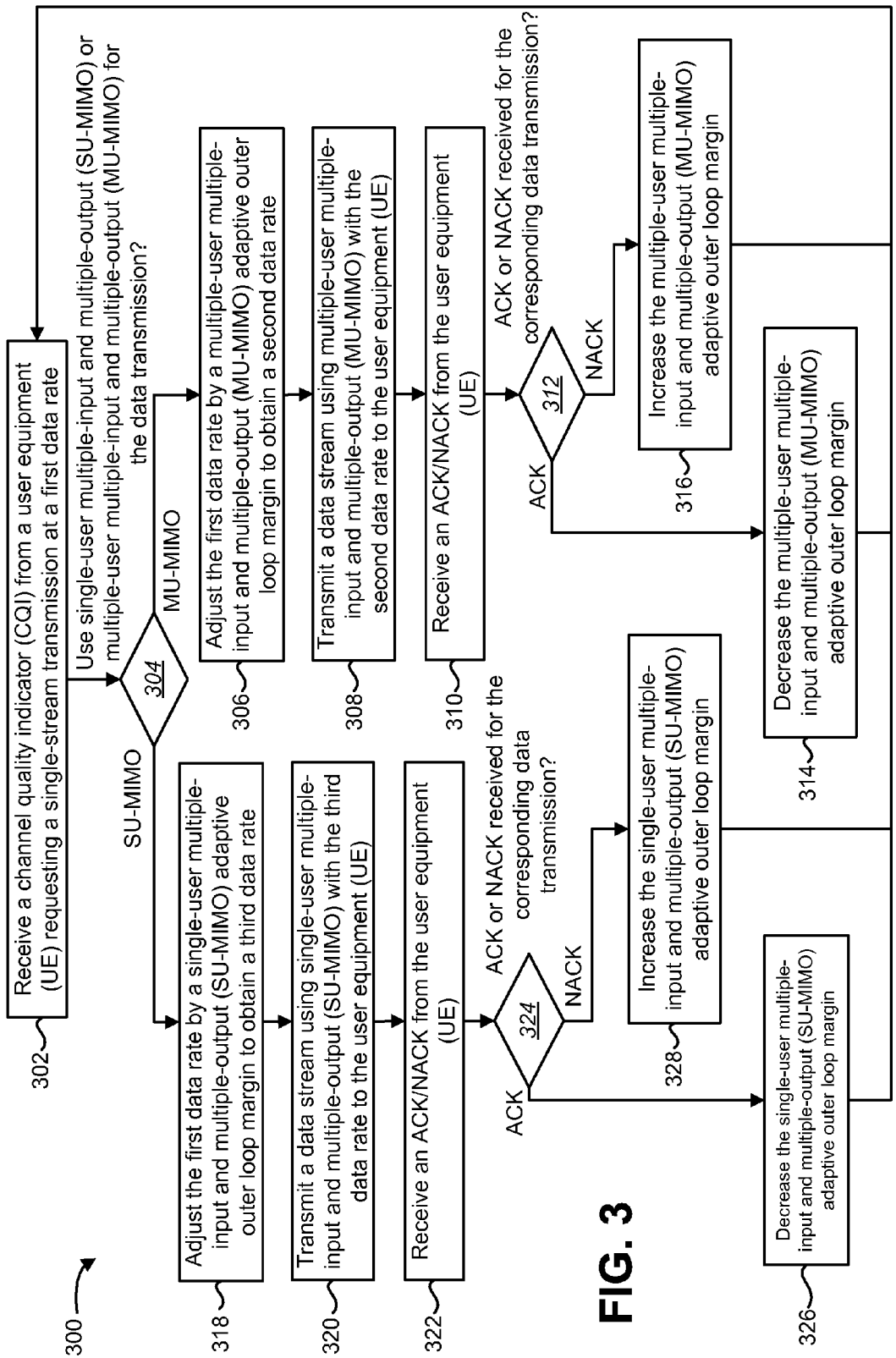
FIG. 3 is a flow diagram of a method for adjusting a data rate to account for inter-stream interference (ISI) in both single-user multiple-input and multiple-output (SU-MIMO) transmissions and multiple-user multiple-input and multiple-output (MU-MIMO) transmissions.

FIG. 3 is a flow diagram of a method 300 for adjusting a data rate 121 to account for inter-stream interference (ISI) in both single-user multiple-input and multiple-output (SU-MIMO) transmissions and multiple-user multiple-input and multiple-output (MU-MIMO) transmissions. The method 300 may be performed by a base station 102. In one configuration, the base station 102 may be a Node B 202. The method 300 of FIG. 3 requires no channel quality indicator (CQI) 112 reporting changes to the user equipments (UEs) 204 in communication with the base station 102.

The base station 102 may receive 302 a channel quality indicator (CQI) 112 from a user equipment (UE) 204 requesting a single-stream transmission at a first data rate 121. This channel quality indicator (CQI) 112 may not take into account the inter-stream interference (ISI) that may occur if the base station 102 uses a dual-stream transmission. If the channel quality indicator (CQI) 112 received is requesting a dual-stream transmission, the method 300 does not apply. This is because a user equipment (UE) 204 requesting dual-stream transmission requests a particular bit rate from the base station 102 on each stream that takes the inter-stream interference (ISI) into account.

After receiving a channel quality indicator (CQI) 112, the base station 102 may determine 304 whether to use single-user multiple-input and multiple-output (SU-MIMO) or multiple-user multiple-input and multiple-output (MU-MIMO) for the data transmission. The base station 102 may use a ranking algorithm to determine whether to use single-user multiple-input and multiple-output (SU-MIMO) or multiple-user multiple-input and multiple-output (MU-MIMO) for the data transmission. The ranking algorithm is discussed in additional detail below.

If the base station 102 determines to use multiple-user multiple-input and multiple-output (MU-MIMO) for the data transmission, the base station 102 may adjust 306 the first data rate 121 by a multiple-user multiple-input and multiple-output (MU-MIMO) adaptive outer loop margin 115 to obtain a second data rate 121. The multiple-user multiple-input and multiple-output (MU-MIMO) adaptive outer loop margin 115 may be positive or negative in the dB (logarithmic) domain. The multiple-user multiple-input and multiple-output (MU-MIMO) adaptive outer loop margin 115 may be additive in the logarithm domain and multiplicative in the linear domain. In one configuration, the multiple-user multiple-input and multiple-output (MU-MIMO) adaptive outer loop margin 115 may not be constant; instead the multiple-user multiple-input and multiple-output (MU-MIMO) adaptive outer loop margin 115 may be updated whenever an ACK/NACK is received. In another configuration, the multiple-user multiple-input and multiple-output (MU-MIMO) adaptive outer loop margin 115 may be a constant. The base station 102 may then transmit 308 a data stream using multiple-user multiple-input and multiple-output (MU-MIMO) with the second data rate 121 to the user equipment (UE) 204.

The base station 102 may receive 310 an ACK/NACK from the user equipment (UE) 204. The base station 102 may then determine 312 whether an ACK or a NACK was received for the corresponding data transmission. If an ACK was received (i.e., the user equipment (UE) 204 was able to successfully decode the data transmission), the base station 102 may decrease 314 the multiple-user multiple-input and multiple-output (MU-MIMO) adaptive outer loop margin 115. In one configuration, the base station 102 may incrementally decrease 314 the multiple-user multiple-input and multiple-output (MU-MIMO) adaptive outer loop margin 115. In yet another configuration, the base station 102 may decrease 314 the multiple-user multiple-input and multiple-output (MU-MIMO) adaptive outer loop margin 115 using a function. The base station 102 may then wait to receive 302 another channel quality indicator (CQI) 112 from a user equipment (UE) 204.

If a NACK was received (i.e., the user equipment (UE) 204 was unable to successfully decode the data transmission), the base station 102 may increase 316 the multiple-user multiple-input and multiple-output (MU-MIMO) adaptive outer loop margin 115. In one configuration, the base station 102 may incrementally increase 316 the multiple-user multiple-input and multiple-output (MU-MIMO) adaptive outer loop margin 115. In yet another configuration, the base station 102 may increase 316 the multiple-user multiple-input and multiple-output (MU-MIMO) adaptive outer loop margin 115 using a function. The base station 102 may then wait to receive 302 another channel quality indicator (CQI) 112 from a user equipment (UE) 204.

If the base station 102 determines to use single-user multiple-input and multiple-output (SU-MIMO) for the data transmission, the base station 102 may adjust 318 the first data rate 121 by a single-user multiple-input and multiple-output (SU-MIMO) adaptive outer loop margin 117 to obtain a third data rate 121. The single-user multiple-input and multiple-output (SU-MIMO) adaptive outer loop margin 117 may be positive or negative in the dB (logarithmic) domain. The single-user multiple-input and multiple-output (SU-MIMO) adaptive outer loop margin 117 may be additive in the logarithm domain and multiplicative in the linear domain. In one configuration, the single-user multiple-input and multiple-output (SU-MIMO) adaptive outer loop margin 117 may not be constant; instead the single-user multiple-input and multiple-output (SU-MIMO) adaptive outer loop margin 117 may be updated whenever an ACK/NACK is received. In another configuration, the single-user multiple-input and multiple-output (SU-MIMO) adaptive outer loop margin 117 may be a constant. The base station 102 may then transmit 320 a data stream using single-user multiple-input and multiple-output (SU-MIMO) with the third data rate 121 to the user equipment (UE) 204.

The base station 102 may receive 322 an ACK/NACK from the user equipment (UE) 204. The base station 102 may then determine 324 whether an ACK or a NACK was received for the corresponding data transmission. If an ACK was received (i.e., the user equipment (UE) 204 was able to successfully decode the data transmission), the base station 102 may decrease 326 the single-user multiple-input and multiple-output (SU-MIMO) adaptive outer loop margin 117. In one configuration, the base station 102 may incrementally decrease 326 the single-user multiple-input and multiple-output (SU-MIMO) adaptive outer loop margin 117. In yet another configuration, the base station 102 may decrease 326 the single-user multiple-input and multiple-output (SU-MIMO) adaptive outer loop margin 117 using a function. The base station 102 may then wait to receive 302 another channel quality indicator (CQI) 112 from a user equipment (UE) 204.

If a NACK was received (i.e., the user equipment (UE) 204 was unable to successfully decode the data transmission), the base station 102 may increase 328 the single-user multiple-input and multiple-output (SU-MIMO) adaptive outer loop margin 117. In one configuration, the base station 102 may incrementally increase 328 the single-user multiple-input and multiple-output (SU-MIMO) adaptive outer loop margin 117. In yet another configuration, the base station 102 may increase 328 the single-user multiple-input and multiple-output (SU-MIMO) adaptive outer loop margin 117 using a function. The base station 102 may then wait to receive 302 another channel quality indicator (CQI) 112 from a user equipment (UE) 204.

Because the single-user multiple-input and multiple-output (SU-MIMO) adaptive outer loop margin 117 and the multiple-user multiple-input and multiple-output (MU-MIMO) adaptive outer loop margin 115 are dynamic, the method 300 of FIG. 3 may be referred to as the dual outer loop algorithm. One advantage of the dual outer loop algorithm is that no change to the channel quality indicator (CQI) 112 reporting protocol (e.g., the High-Speed Packet Access (HSPA) standards established by 3GPP) is required. One possible disadvantage may be that the single-user multiple-input and multiple-output (SU-MIMO) adaptive outer loop margin 117 and the multiple-user multiple-input and multiple-output (MU-MIMO) adaptive outer loop margin 115 may change relatively slowly, inhibiting optimal performance.

FIG. 4 is a block diagram illustrating a comparison table for pairing user equipments (UEs) 404. In the table, five user equipments (UEs) 404a-e are compared to determine user equipment (UE) pairs 432. Each of the user equipments (UEs) 404 is dual-stream capable. However, only the preferred beam 228 for each user equipment (UE) 404 is compared with the preferred beam 228 for each other user equipment (UE) 404.

A user equipment (UE) pair 432 occurs when the preferred beam 228 for one user equipment (UE) 404 is orthogonal to the preferred beam 228 for another user equipment (UE) 404. For example, the preferred beam 228 for UE1 404a may be orthogonal to the preferred beam 228 for UE4 404d. Thus, UE1 404a and UE4 404d are a user equipment (UE) pair 432a. As another example, the preferred beam 228 for UE2 404b may be orthogonal to the preferred beam 228 for UE3 404c. Thus, UE2 404b and UE3 404c are a user equipment (UE) pair 432b. If the preferred beams 228 for user equipments (UEs) 404 are not orthogonal, the matchup may be listed as non-orthogonal. A user equipment (UE) 404 may have a preferred beam 228 that is orthogonal to the preferred beams 228 of multiple user equipments (UEs) 404. A user equipment (UE) 404 may also have a preferred beam 228 that is orthogonal to none of the preferred beams 228 of the user equipments (UEs) 404 available for pairing. For example, UE5 404e is shown as having a preferred beam 228 that is non-orthogonal to the preferred beams 228 of the other user equipments (UEs) 404.

In case of multiple user equipment (UE) pairs 432, a base station 102 may select one of the user equipment (UE) pairs 432. Many different methods may be used for selecting one of the user equipment (UE) pairs 432. For example, a sum proportional fair metric may be used.

Usually scheduling aims to maximize a utility function $U(R_1(t), \ldots, R_N(t))$ by allocating resources per transmission time interval (TTI) to certain users. The utility function for proportional fairness is given in Equation (1):

$$U(R_1(t), \ldots, R_N(t)) = \sum_{i=1}^{N} \log(R_i(t)) \rightarrow \max. \quad (1)$$

In Equation (1) $R_i(t)$ denotes the average throughput of user i at time t. Assuming one stream, Equation (1) is equivalent to the resource allocation rule per transmission time interval (TTI) in Equation (2):

$$\max_{\delta_i} \sum_{i=1}^{N} \frac{\delta_i \cdot r_i(t)}{R_i(t)}, \delta_i \in \{0, 1\}. \quad (2)$$

In Equation (2), $r_i(t)$ denotes the instantaneous rate the offers to user i at time t and $\delta_i \in \{0,1\}$ indicates the resource allocation to user i. The task of the scheduler is to allocate resources per transmission time interval (TTI) (i.e., to choose the indices $\delta_i$ in order to maximize the utility function). The resource allocation rule can be generalized for SU-MIMO in Equation (3):

$$\max_{\delta_i} \sum_{i=1}^{N} \frac{\delta_i \sum_{j=1}^{M} r_{ij}(t)}{R_i(t)}, \delta_i \in \{0, 1\}. \quad (3)$$

For a 2×2 MU-MIMO, the rule to pair the users $i_1$ and $i_2$ is given in Equation (4):

$$\max_{\substack{i_1, i_2 \in [1 \ldots, \ldots N] \\ i_1 \neq i_2}} \left( \max\left( \frac{r_{i_1 1}(t)}{R_{i_1}(t)} + \frac{r_{i_2 2}(t)}{R_{i_2}(t)}; \frac{r_{i_1 2}(t)}{R_{i_1}(t)} + \frac{r_{i_2 1}(t)}{R_{i_2}(t)} \right) \right). \quad (4)$$

The pairing algorithm decides which users and streams are paired per transmission time interval (TTI) according to the MU-MIMO proportional fair rule. The pairing algorithm then determines ∀ precoding vectors $b_k$, k=1 ... 4 and all candidate users $u_j$ per transmission time interval (TTI). The candidate sets are $U(b_k)=\{(u_j, CQI(b_k)\}$, where $b_k$ is a preferred primary precoding vector for $u_j$. Candidate users do not require a rank-2 CQI report. Precoding vectors $b_k$ and $b_{5-k}$ are assumed to be orthogonal. The user pairs for MU-MIMO transmission may then be determined using one or more approaches. In a first approach, the user pairs $(u_i, u_j) \in (U(b_k), U(b_{5-k}))$ can be scheduled. For linear receivers, the preferred precoding vector offers a better CQI. This approach works irrespective of the receiver architecture.

A ranking algorithm may then be used. The ranking algorithm may identify per transmission time interval (TTI) the highest prioritized MU-MIMO pairs and the highest prioritized SU-MIMO users. A user is called eligible if it has a free HARQ process and data in its MAC priority queue(s). The reported CQI (quantized signal to noise ratio (SNR) in decibels (dB)) may be mapped to a spectral efficiency (in bits/symbol) for each eligible user.

An SU-MIMO user ranking list may then be calculated for all eligible users according to the proportional fair rule. Single or dual stream SU-MIMO may be assumed for each eligible user depending on the reported channel rank. The highest prioritized MU-MIMO eligible pair according to the user pairing approach may be determined according to the proportional fair rule. If needed, the spectral efficiencies may be rescaled to account for the power split between the paired users. Based on a priority comparison, either the highest prioritized user from the SU-MIMO ranking list or the highest prioritized MU-MIMO user pair may be scheduled in the instantaneous transmission time interval (TTI) (assuming that only one user for SU-MIMO or one user pair for MU-MIMO is scheduled per transmission time interval (TTI)). A CQI mapping table may then be used.

Figure 5:
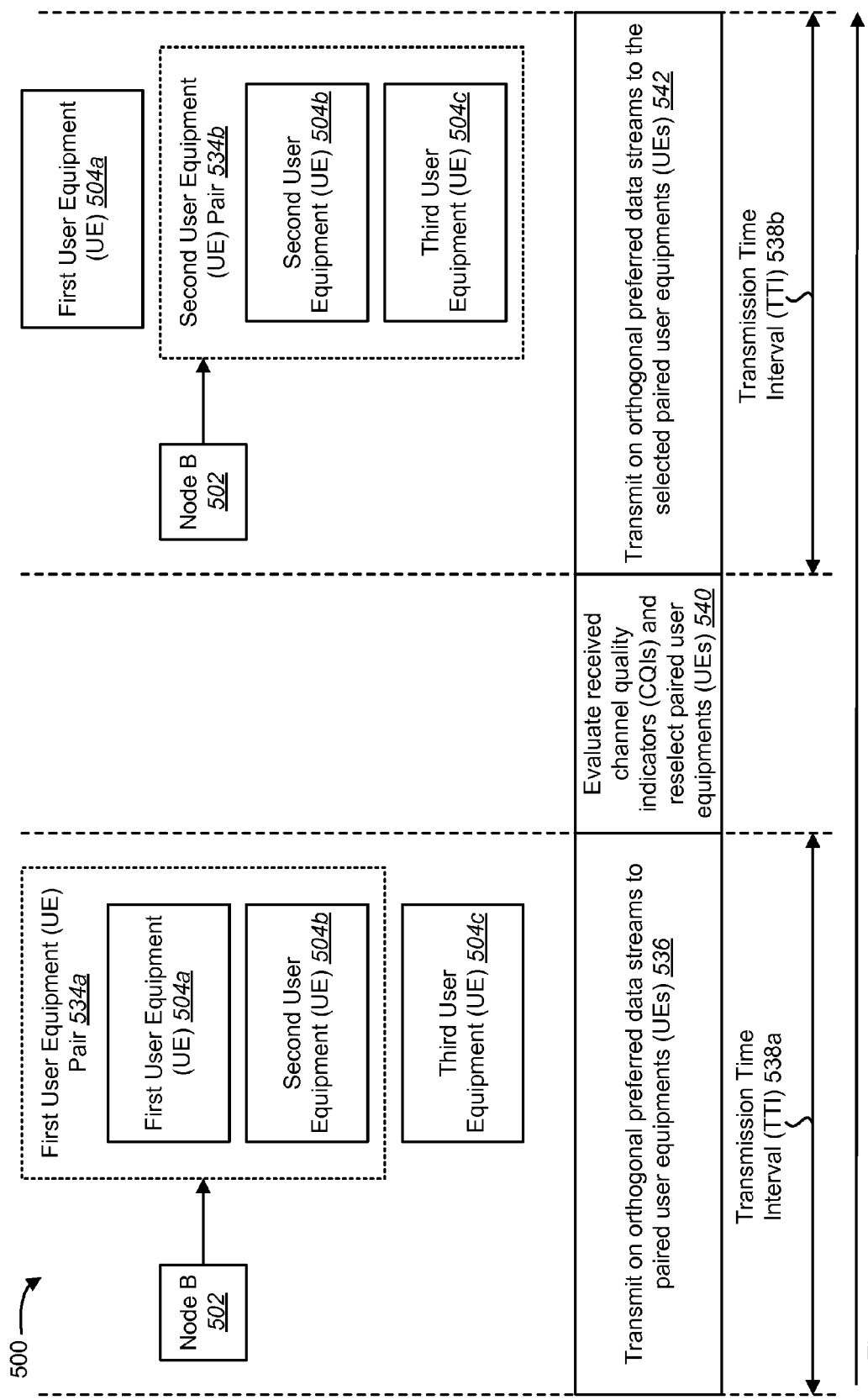
FIG. 5 is a block diagram illustrating a timeline with multiple transmission time intervals (TTIs)

FIG. 5 is a block diagram illustrating a timeline 500 with multiple transmission time intervals (TTIs) 538. A Node B 502 may communicate with a first user equipment (UE) 504a, a second user equipment (UE) 504b and a third user equipment (UE) 504c. During a first transmission time interval (TTI) 538a, the first user equipment (UE) 504a and the second user equipment (UE) 504b may be part of a first user equipment (UE) pair 534a. The Node B 502 may transmit 536 on orthogonal preferred data streams 218 to the first user equipment (UEs) pair 534 (i.e., to the first user equipment (UE) 504a using a first user equipment (UE) preferred data stream 218a and to the second user equipment (UE) 504b using a second user equipment (UE) preferred data stream 218b) during the first transmission time interval (TTI) 538a.

After the first transmission time interval (TTI) 538a, the Node B 502 may evaluate 540 received channel quality indicators (CQIs) 112 and reselect the user equipment (UE) pair 534. For example, the Node B 502 may select a second user equipment (UE) pair 534b for a second transmission time interval (TTI) 538b. The second user equipment (UE) pair 534b may include the second user equipment (UE) 504b and the third user equipment (UE) 504c. The Node B 502 may then transmit 542 on the orthogonal preferred data streams 218 to the selected user equipment (UE) pair 534b (i.e., to the second user equipment (UE) 504b using a second user equipment (UE) preferred data stream 218b and to the third user equipment (UE) 504c using a third user equipment (UE) preferred data stream (not shown)) during the second transmission time interval (TTI) 538b.

Figure 6:
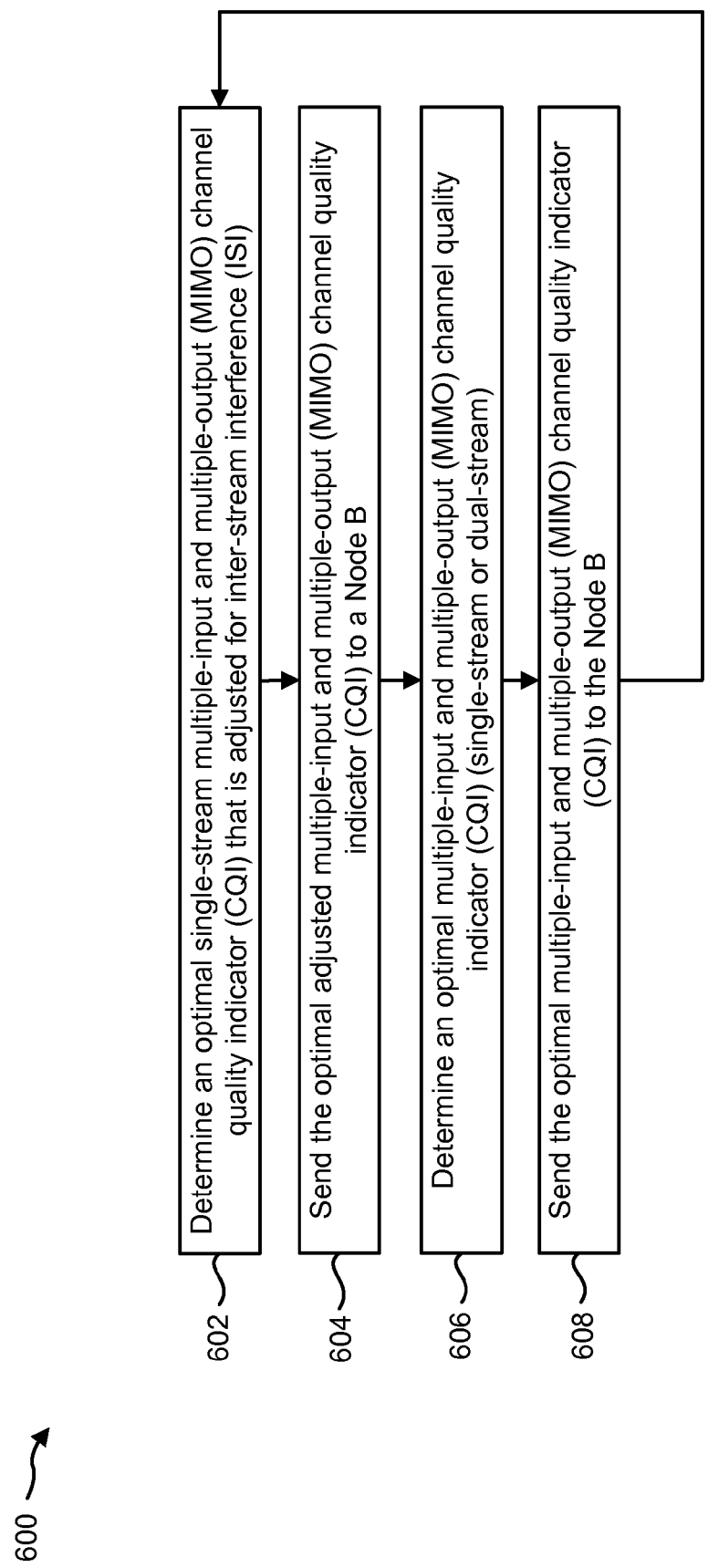
FIG. 6 is a flow diagram of a method for sending channel quality indicator (CQI) feedback that accounts for inter-stream interference (ISI)

FIG. 6 is a flow diagram of a method 600 for sending channel quality indicator (CQI) 112 feedback that accounts for inter-stream interference (ISI). The method 600 may be performed by a user equipment (UE) 204. The user equipment (UE) 204 may be operating in a High-Speed Packet Access (HSPA) system. In the method 600 of FIG. 6, no standards changes are necessary for the base station 102 receiving the channel quality indicators (CQIs) 112.

The user equipment (UE) 204 may determine 602 an optimal single-stream multiple-input and multiple-output (MIMO) channel quality indicator (CQI) 112 that is adjusted for inter-stream interference (ISI). Whenever the user equipment (UE) 204 computes a channel quality indicator (CQI) 112 along a beam for multiple-user multiple-input and multiple-output (MU-MIMO), the user equipment (UE) 204 may assume 50% of the power on the beam that is orthogonal to it. This is enough to obtain a channel quality indicator (CQI) 112 that is adjusted for inter-stream interference (ISI).

There may be four possible single-stream channel quality indicators (CQIs) 112 to choose from. In some configurations of High-Speed Packet Access (HSPA), single-stream multiple-input and multiple-output (MIMO) channel quality indicators (CQIs) 112 may not account for inter-stream interference (ISI), leading to a base station 102 transmitting at an overly optimistic data rate 121 (i.e., a large transmit block size (TBS)) to the user equipment (UE) 204 if the base station 102 is using multiple-user multiple-input and multiple-output (MU-MIMO). The user equipment (UE) 204 may send 604 the optimal adjusted MIMO channel quality indicator (CQI) 112 to a Node B 202.

The user equipment (UE) 204 may then determine 606 an optimal multiple-input and multiple-output (MIMO) channel quality indicator (CQI) 112. The optimal multiple-input and multiple-output (MIMO) channel quality indicator (CQI) 112 may request either a single-stream or a dual-stream data transmission. The optimal multiple-input and multiple-output (MIMO) channel quality indicator (CQI) 112 may be a channel quality indicator (CQI) 112 that is generated according to Release 7. The decision between an optimal single-stream channel quality indicator (CQI) 112 and an optimal dual-stream channel quality indicator (CQI) 112 within a transmission time interval (TTI) 538 may be performed according to the High-Speed Packet Access protocol (e.g., Release 7).

There may be four possible single-stream channel quality indicators (CQIs) 112 and two possible dual-stream channel quality indicators (CQIs) 112. The user equipment (UE) 204 may calculate the optimal multiple-input and multiple-output (MIMO) channel quality indicator (CQI) 112 as the best of the six possible channel quality indicators (CQIs) 112. The optimal multiple-input and multiple-output (MIMO) channel quality indicator (CQI) 112 may refer to a regular channel quality indicator (CQI) 112 as it is fed back by the user equipment (UE) 204 to a base station 102 according to Release 7. The user equipment (UE) 204 may send 608 the optimal multiple-input and multiple-output (MIMO) channel quality indicator (CQI) 112 to the base station 102. The user equipment (UE) 204 may then return to determining 602 an optimal single-stream multiple-input and multiple-output (MIMO) channel quality indicator (CQI) 112 that is adjusted for inter-stream interference (ISI).

In general, user equipments (UEs) 204 with good geometry may report dual-stream channel quality indicators (CQIs) 112 more often than single-stream channel quality indicators (CQIs) 112. User equipments (UEs) 204 at the edge of a cell may report single-stream channel quality indicators (CQIs) 112 more often than dual-stream channel quality indicators (CQIs) 112.

Thus, the user equipment (UE) 204 may alternate between sending a channel quality indicator (CQI) 112 that is adjusted for inter-stream interference (ISI) and a channel quality indicator (CQI) 112 that is generated as in Release 7. In other words, the user equipment (UE) 204 may interlace optimal single-stream channel quality indicators (CQIs) 112 that are adjusted for inter-stream interference (ISI) in between the optimal multiple-input and multiple-output (MIMO) channel quality indicators (CQIs) 112 (that are generated as in Release 7). Depending on a feedback cycle used by the user equipment (UE) 204, the user equipment (UE) 204 may send one channel quality indicator (CQI) 112 for each transmission time interval (TTI) 538.

One advantage of using the user equipment (UE) 204 solution (i.e., the method 600 of FIG. 6) instead of the base station 102 solution (i.e., the method 300 of FIG. 3) is that better performance may be obtained. In every transmission time interval (TTI) 538, the base station 102 has access to a channel quality indicator (CQI) 112 for scheduling single-user multiple-input and multiple-output (SU-MIMO) transmissions and a channel quality indicator (CQI) 112 for scheduling multiple-user multiple-input and multiple-output (MU-MIMO) transmissions. The base station 102 may also use the best multiple-input and multiple-output (MIMO) channel quality indicator (CQI) 112 when scheduling single-user multiple-input and multiple-output (SU-MIMO) data transmissions. Each of these channel quality indicators (CQIs) 112 is outdated by at most one extra transmission time interval (TTI) more than usual.

One consequence of using the user equipment (UE) 204 solution is that it may require changes to the channel quality indicator (CQI) 112 reporting protocol (e.g., the High-Speed Packet Access standards established by 3GPP). These changes may include implementing higher-layer messaging to configure the channel quality indicator (CQI) 112 feedback algorithm of the user equipment (UE) 204.

Figure 7:
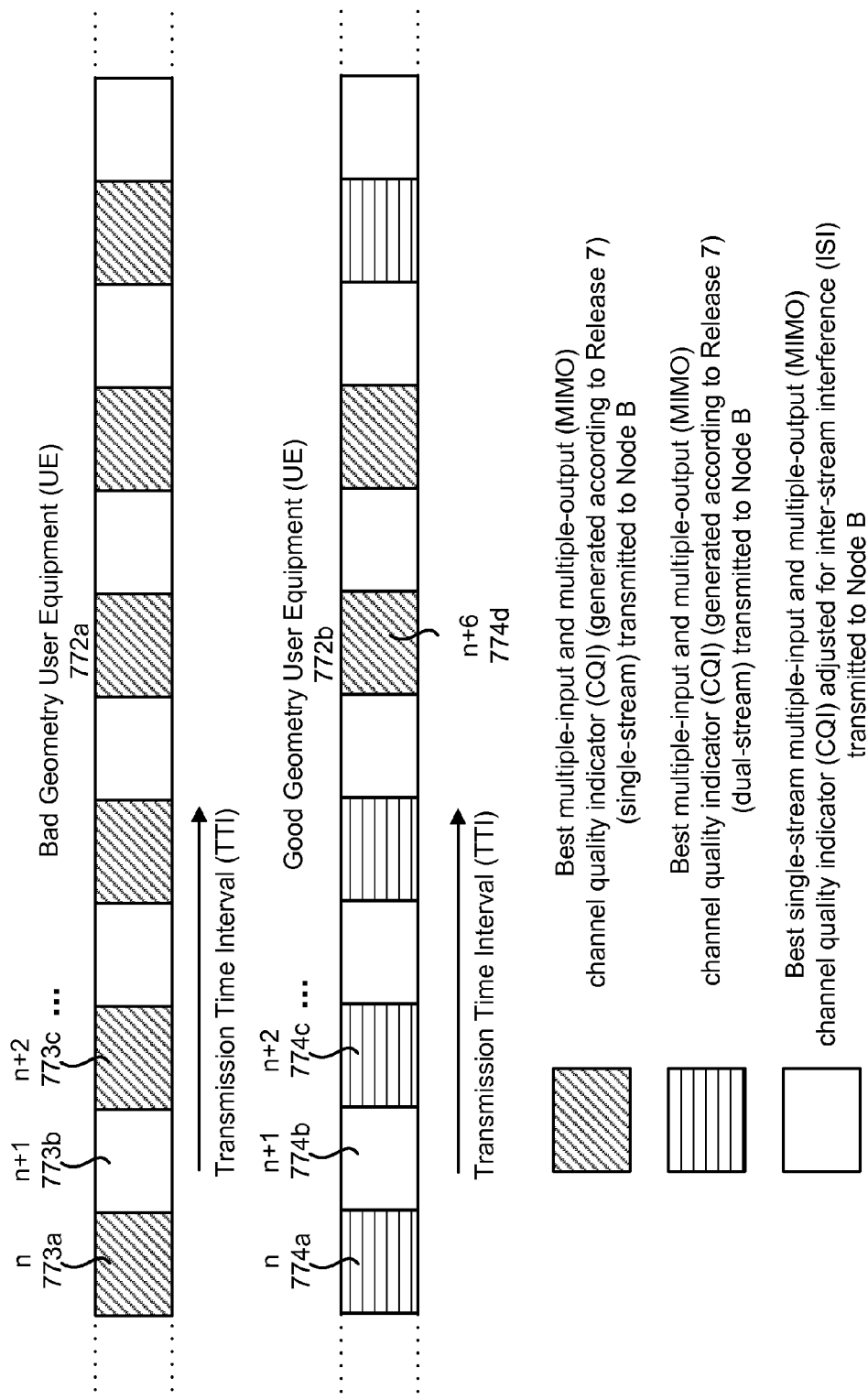
FIG. 7 is a timing diagram illustrating channel quality indicator (CQI) feedback cycles for user equipments (UEs)

FIG. 7 is a timing diagram illustrating channel quality indicator (CQI) 112 feedback cycles for user equipments (UEs) 772a-b. FIG. 7 is a timing diagram for the method 600 illustrated in FIG. 6. Each box represents a channel quality indicator (CQI) 112 report for a given transmission time interval (TTI). As discussed above, a user equipment (UE) 772 may interlace optimal single-stream channel quality indicators (CQIs) 112 that are adjusted for inter-stream interference (ISI) in between the optimal multiple-input and multiple-output (MIMO) channel quality indicators (CQIs) 112 generated as in Release 7 (referred to as an optimal Rel-7 channel quality indicator (CQI) 112).

The optimal Rel-7 channel quality indicator (CQI) 112 for a bad geometry user equipment (UE) 772a may often be a single-stream channel quality indicator (CQI) 112 such as that used in the transmission time interval (TTI) n 773a and in the transmission time interval (TTI) n+2 773c. In contrast, the optimal channel quality indicator (CQI) 112 for a good geometry user equipment (UE) 772b may often be a dual-stream channel quality indicator (CQI) 112 such as that used in the transmission time interval (TTI) n 774a and in the transmission time interval (TTI) n+2 774c. In one configuration (i.e., in the channel quality indicator (CQI) 112 of transmission time interval (TTI) n+6 774d), the optimal channel quality indicator (CQI) 112 for a good geometry user equipment (UE) 772b may instead be a single-stream channel quality indicator (CQI) 112.

The channel quality indicator (CQI) 112 reporting for either a bad geometry user equipment (UE) 772a or a good geometry user equipment (UE) 772b may be unchanged for every other transmission time interval (TTI) (e.g., n, n+2, n+4, etc.). In between these transmission time intervals (TTIs), both a bad geometry user equipment (UE) 772a and a good geometry user equipment (UE) 772b may determine and send an optimal single-stream channel quality indicator (CQI) 112 that has been adjusted for inter-stream interference (ISI) such as the channel quality indicator (CQI) 112 for the transmission time interval (TTI) n+1 773b for the bad geometry user equipment (UE) 772a and the channel quality indicator (CQI) 112 for the transmission time interval (TTI) n+1 774b for the good geometry user equipment (UE) 772b (e.g., for transmission time intervals (TTIs) n+1, n+3, n+5, etc.).

FIG. 7 as illustrated is for a feedback cycle equal to 1. FIG. 7 may change accordingly for a feedback cycle that is greater than 1.

Figure 8:
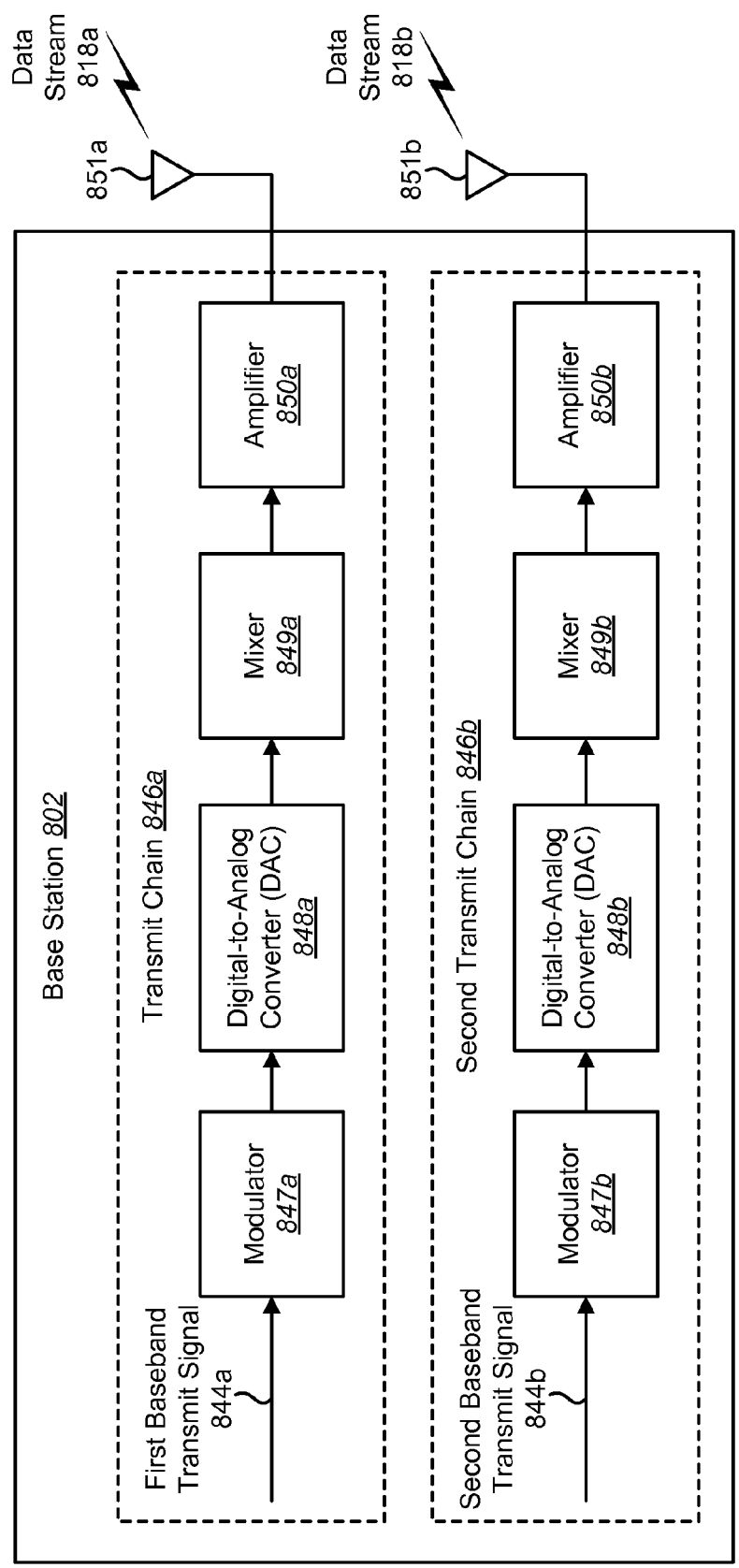
FIG. 8 is a block diagram of a base station for use in the present systems and methods.

FIG. 8 is a block diagram of a base station 802 for use in the present systems and methods. The base station 802 of FIG. 8 may be one configuration of the base station 102 of FIG. 1. The base station 802 may include a first transmit chain 846a and a second transmit chain 846b. The first transmit chain 846a may be used for a first data stream 818a and the second transmit chain 846b may be used for a second data stream 818b.

The first transmit chain 846a may include a first baseband transmit signal 844a. The first baseband transmit signal 844a may be modulated using a modulator 847a, converted from a digital signal to an analog signal using a digital-to-analog converter (DAC) 848a, frequency converted using a mixer 849a, amplified using an amplifier 850a and finally transmitted by a first antenna 851a as the first data stream 818a. Likewise, the second transmit chain 846b may include a second baseband transmit signal 844b. The second baseband transmit signal 844b may be modulated using a modulator 847b, converted from a digital signal to an analog signal using a digital-to-analog converter (DAC) 848b, frequency converted using a mixer 849b, amplified using an amplifier 850b and finally transmitted by a second antenna 851b as the second data stream 818b. As discussed above, the first data stream 818a and the second data stream 818b may be transmitted during the same transmission time interval (TTI) 538 using the same orthogonal variable spreading factor (OVSF) codes 226 with orthogonal beams.

Figure 9:
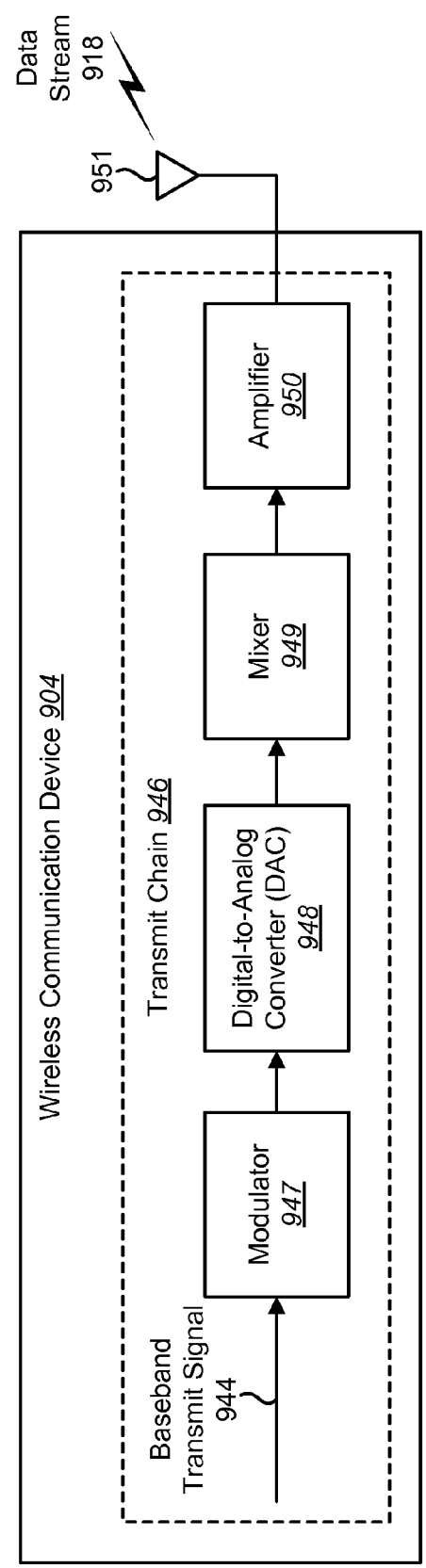
FIG. 9 is a block diagram of a wireless communication device for use in the present systems and methods.

FIG. 9 is a block diagram of a wireless communication device 904 for use in the present systems and methods. The wireless communication device 904 of FIG. 9 may be one configuration of the wireless communication devices 104 of FIG. 1. The wireless communication device 904 may include a transmit chain 946. The transmit chain 946 may be used for a data stream 918.

The transmit chain 946 may include a baseband transmit signal 944. The baseband transmit signal 944 may be modulated using a modulator 947, converted from a digital signal to an analog signal using a digital-to-analog converter (DAC) 948, frequency converted using a mixer 949, amplified using an amplifier 950 and finally transmitted by an antenna 951 as the data stream 918. The data stream 918 may include one or more channel quality indicators (CQIs) sent by the wireless communication device 904 to a base station 102.

Figure 10:
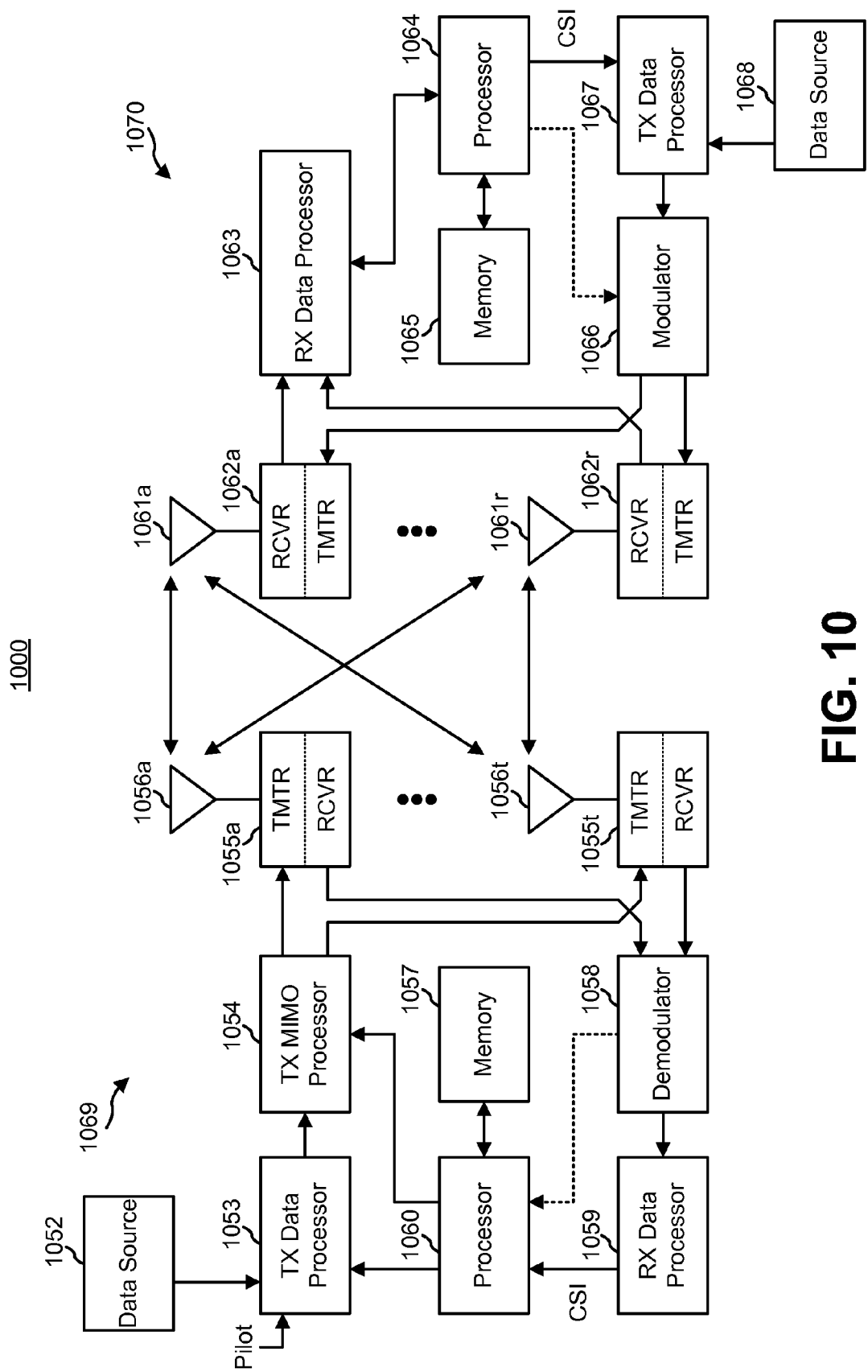
FIG. 10 is a block diagram of a transmitter and receiver in a multiple-input and multiple-output (MIMO) system.

FIG. 10 is a block diagram of a transmitter 1069 and receiver 1070 in a multiple-input and multiple-output (MIMO) system 1000. In the transmitter 1069, traffic data for a number of data streams is provided from a data source 1052 to a transmit (TX) data processor 1053. Each data stream may then be transmitted over a respective transmit antenna 1056a through 1056t. The transmit (TX) data processor 1053 may format, code and interleave the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 1070 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 1054, which may further process the modulation symbols (e.g., for OFDM). The transmit (TX) multiple-input multiple-output (MIMO) processor 1054 then provides NT modulation symbol streams to NT transmitters (TMTR) 1055a through 1055t. The TX transmit (TX) multiple-input multiple-output (MIMO) processor 1054 may apply beamforming weights to the symbols of the data streams and to the antenna 1056 from which the symbol is being transmitted.

Each transmitter 1055 may receive and process a respective symbol stream to provide one or more analog signals, and further condition (e.g., amplify, filter and upconvert) the analog signals to provide a modulated signal suitable for transmission over the MIMO channel. NT modulated signals from transmitters 1055a through 1055t are then transmitted from NT antennas 1056a through 1056t, respectively.

At the receiver 1070, the transmitted modulated signals are received by NR antennas 1061a through 1061r and the received signal from each antenna 1061 is provided to a respective receiver (RCVR) 1062a through 1062r. Each receiver 1062 may condition (e.g., filter, amplify and downconvert) a respective received signal, digitize the conditioned signal to provide samples and further process the samples to provide a corresponding "received" symbol stream.

An RX data processor 1063 then receives and processes the NR received symbol streams from NR receivers 1062 based on a particular receiver processing technique to provide NT "detected" symbol streams. The RX data processor 1063 then demodulates, deinterleaves and decodes each detected symbol stream to recover the traffic data for the data stream. The processing by RX data processor 1063 is complementary to that performed by TX MIMO processor 1054 and TX data processor 1053 at transmitter system 1069.

A processor 1064 may periodically determine which precoding matrix to use. The processor 1064 may store information on and retrieve information from memory 1065. The processor 1064 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 1067, which also receives traffic data for a number of data streams from a data source 1068, modulated by a modulator 1066, conditioned by transmitters 1062a through 1062r and transmitted back to the transmitter 1069.

At the transmitter 1069, the modulated signals from the receiver are received by antennas 1056, conditioned by receivers 1055, demodulated by a demodulator 1058 and processed by an RX data processor 1059 to extract the reverse link message transmitted by the receiver system 1070. A processor 1060 may receive channel state information (CSI) from the RX data processor 1059. The processor 1060 may store information on and retrieve information from memory 1057. The processor 1060 then determines which pre-coding matrix to use for determining the beamforming weights and then processes the extracted message.

Figure 11:
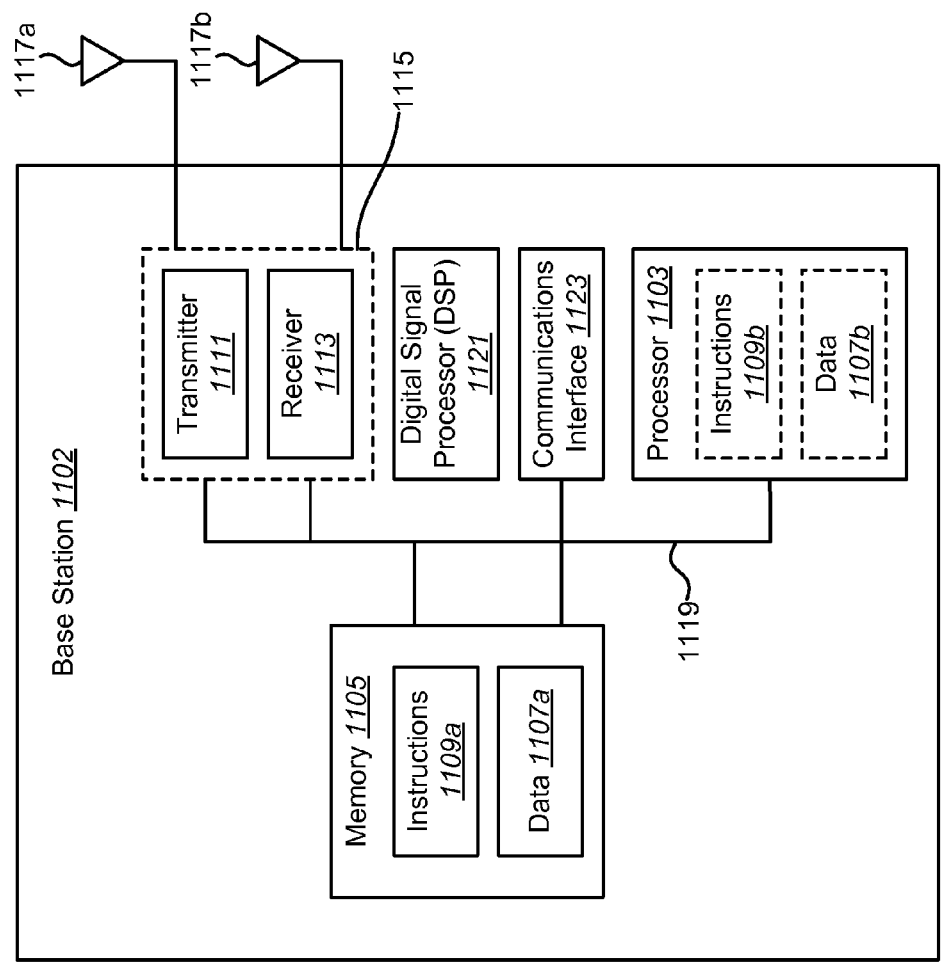
FIG. 11 illustrates certain components that may be included within a base station.

FIG. 11 illustrates certain components that may be included within a base station 1102. A base station may also be referred to as, and may include some or all of the functionality of, an access point, a broadcast transmitter, a NodeB, an evolved NodeB, etc. The base station 1102 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1102 of FIG. 11, in an alternative configuration, a combination of processors (e.g., an ARM and DSP) could be used.

The base station 1102 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1107a and instructions 1109a may be stored in the memory 1105. The instructions 1109a may be executable by the processor 1103 to implement the methods disclosed herein. Executing the instructions 1109a may involve the use of the data 1107a that is stored in the memory 1105. When the processor 1103 executes the instructions 1109a, various portions of the instructions 1109b may be loaded onto the processor 1103, and various pieces of data 1107b may be loaded onto the processor 1103.

The base station 1102 may also include a transmitter 1111 and a receiver 1113 to allow transmission and reception of signals to and from the base station 1102. The transmitter 1111 and receiver 1113 may be collectively referred to as a transceiver 1115. Multiple antennas 1117a-b may be electrically coupled to the transceiver 1115. The base station 1102 may also include (not shown) multiple transmitters, multiple receivers, multiple transceivers and/or additional antennas.

The base station 1102 may include a digital signal processor (DSP) 1121. The base station 1102 may also include a communications interface 1123. The communications interface 1123 may allow a user to interact with the base station 1102.

The various components of the base station 1102 may be coupled together by one or more buses, which may include a power bus, a control signal bus, a status signal bus, a data bus, etc. For the sake of clarity, the various buses are illustrated in FIG. 11 as a bus system 1119.

Figure 12:
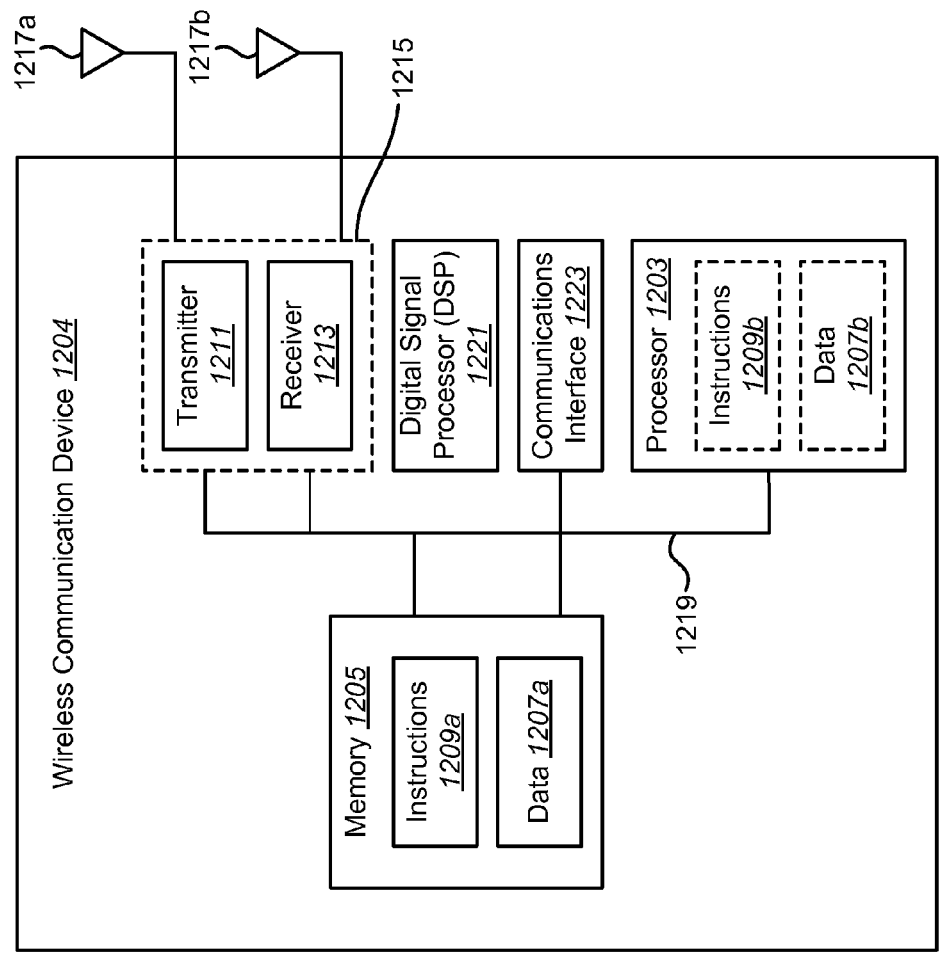
FIG. 12 illustrates certain components that may be included within a wireless communication device.

FIG. 12 illustrates certain components that may be included within a wireless communication device 1204. The wireless communication device 1204 may be an access terminal, a mobile station, a user equipment (UE), etc. The wireless communication device 1204 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless communication device 1204 of FIG. 12, in an alternative configuration, a combination of processors (e.g., an ARM and DSP) could be used.

The wireless communication device 1204 also includes memory 1205. The memory 1205 may be any electronic component capable of storing electronic information. The memory 1205 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1207a and instructions 1209a may be stored in the memory 1205. The instructions 1209a may be executable by the processor 1203 to implement the methods disclosed herein. Executing the instructions 1209a may involve the use of the data 1207a that is stored in the memory 1205. When the processor 1203 executes the instructions 1209a, various portions of the instructions 1209b may be loaded onto the processor 1203, and various pieces of data 1207b may be loaded onto the processor 1203.

The wireless communication device 1204 may also include a transmitter 1211 and a receiver 1213 to allow transmission and reception of signals to and from the wireless communication device 1204. The transmitter 1211 and receiver 1213 may be collectively referred to as a transceiver 1215. Multiple antennas 1217a-b may be electrically coupled to the transceiver 1215. The wireless communication device 1204 may also include (not shown) multiple transmitters, multiple receivers, multiple transceivers and/or additional antennas.

The wireless communication device 1204 may include a digital signal processor (DSP) 1221. The wireless communication device 1204 may also include a communications interface 1223. The communications interface 1223 may allow a user to interact with the wireless communication device 1204.

The various components of the wireless communication device 1204 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3 and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing multiple-user multiple-input and multiple-output in a high-speed packet access system, comprising:
   receiving a channel quality indicator from a dual-stream-capable wireless communication device requesting a single-stream transmission at a first data rate;
   adjusting the first data rate by an adaptive outer loop margin to obtain a second data rate;
   transmitting a data stream to the wireless communication device using the second data rate;
   receiving a positive-acknowledgement/negative-acknowledgement (ACK/NACK) from the wireless communication device; and
   adjusting the adaptive outer loop margin according to the received ACK/NACK,
   wherein the adaptive outer loop margin comprises a first adaptive outer loop margin for single-user multiple-input and multiple-output transmissions and a second adaptive outer loop margin for multiple-user multiple-input and multiple-output transmissions.

2. The method of claim 1, wherein the method is performed by a Node B.

3. The method of claim 1, further comprising determining to use single-user multiple-input and multiple-output for transmissions, and wherein the data stream is transmitted using single-user multiple-input and multiple-output.

4. The method of claim 1, further comprising determining to use multiple-user multiple-input and multiple-output for transmissions, and wherein the data stream is transmitted using multiple-user multiple-input and multiple-output.

5. The method of claim 1, wherein the ACK/ACK comprises a positive-acknowledgement (ACK), and wherein adjusting the adaptive outer loop margin comprises incrementally decreasing the adaptive outer loop margin.

6. The method of claim 1, wherein the ACK/NACK comprises a negative-acknowledgement (NACK), and wherein adjusting the adaptive outer loop margin comprises incrementally increasing the adaptive outer loop margin.

7. A wireless device configured for providing multiple-user multiple-input and multiple-output in a high-speed packet access system, comprising:
   a processor;
   memory in electronic communication with the processor; and
   instructions stored in the memory, the instructions being executable by the processor to:
      receive a channel quality indicator from a dual-stream-capable wireless communication device requesting a single-stream transmission at a first data rate;
      adjust the first data rate by an adaptive outer loop margin to obtain a second data rate;
      transmit a data stream to the wireless communication device using the second data rate;
      receive a positive-acknowledgement/negative-acknowledgement (ACK/NACK) from the wireless communication device; and
      adjust the adaptive outer loop margin according to the received ACK/NACK,
      wherein the adaptive outer loop margin comprises a first adaptive outer loop margin for single-user multiple-input and multiple-output transmissions and a second adaptive outer loop margin for multiple-user multiple-input and multiple-output transmissions.

8. The wireless device of claim 7, wherein. the wireless device is a Node B.

9. The wireless device of claim 7, wherein the instructions are further executable to determine to use single-user multiple-input and multiple-output for transmissions, and wherein the data stream is transmitted using single-user multiple-input and multiple-output.

10. The wireless device of claim 7, wherein the instructions are further executable to determine to use multiple-user multiple-input and multiple-output for transmissions, and wherein the data stream is transmitted using multiple-user multiple-input and multiple-output.

11. The wireless device of claim 7, wherein the ACK/NACK comprises a positive-acknowledgement (ACK), and wherein adjusting the adaptive outer loop margin comprises incrementally decreasing the adaptive outer loop margin.

12. The wireless device of claim 7, wherein the ACK/NACK comprises a negative-acknowledgement (NACK), and wherein adjusting the adaptive outer loop margin comprises incrementally increasing the adaptive outer loop margin.

13. A wireless device configured for providing multiple-user multiple-input and multiple-output in a high-speed packet access system, comprising:
 means for receiving a channel quality indicator from a dual-stream-capable wireless communication device requesting a single-stream transmission at a first data rate;
 means for adjusting the first data rate by an adaptive outer loop margin to obtain a second data rate;
 means for transmitting a data stream to the wireless communication device using the second data rate;
 means for receiving a positive-acknowledgement/negative-acknowledgement (ACK/NACK) from the wireless communication device; and
 means for adjusting the adaptive outer loop margin according to the received ACK/NACK
 wherein the adaptive outer loop margin comprises a first adaptive outer loop margin for single-user multiple-input and multiple-output transmissions and a second adaptive outer loop margin for multiple-user multiple-input and multiple-output transmissions.

14. A computer-program product for providing multiple-user multiple-input and multiple-output in a high-speed packet access system, the computer-program product comprising a non-transitory computer-readable medium having instructions thereon, the instructions comprising:
 code for causing a base station to receive a channel quality indicator from a dual-stream-capable wireless communication device requesting a single-stream transmission at a first data rate;
 code for causing the base station to adjust the first data rate by an adaptive outer oop margin to obtain a second data rate;
 code for causing the base station to transmit a data stream to the wireless communication device using the second data rate;
 code for causing the base station to receive a positive-acknowledgement/negative-acknowledgement (ACK/NACK) from the wireless communication device; and
 code for causing the base station to adjust the adaptive outer loop margin according to the received ACK/NACK,
 wherein the adaptive outer loop margin comprises a first adaptive outer loop margin for single-user multiple-input and multiple-output transmissions and a second adaptive outer loop margin for multiple-user multiple-input and multiple-output transmissions.

* * * * *